US011634240B2

(12) United States Patent
Pellegrino et al.

(10) Patent No.: US 11,634,240 B2
(45) Date of Patent: Apr. 25, 2023

(54) COILABLE THIN-WALLED LONGERONS AND COILABLE STRUCTURES IMPLEMENTING LONGERONS AND METHODS FOR THEIR MANUFACTURE AND COILING

(71) Applicant: California Institute of Technology, Pasadena, CA (US)

(72) Inventors: Sergio Pellegrino, Pasadena, CA (US); Harry A. Atwater, South Pasadena, CA (US); Seyed Ali Hajimiri, La Cañada, CA (US); Eleftherios E. Gdoutos, Pasadena, CA (US); Christophe Leclerc, Pasadena, CA (US); Fabien A. Royer, Pasadena, CA (US); Antonio Pedivellano, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 481 days.

(21) Appl. No.: 16/514,793

(22) Filed: Jul. 17, 2019

(65) Prior Publication Data
US 2020/0024007 A1      Jan. 23, 2020

Related U.S. Application Data

(60) Provisional application No. 62/699,184, filed on Jul. 17, 2018.

(51) Int. Cl.
*E04B 1/343* (2006.01)
*B64G 1/44* (2006.01)
(Continued)

(52) U.S. Cl.
CPC .................. *B64G 1/44* (2013.01); *B32B 5/02* (2013.01); *B32B 5/12* (2013.01); *B64G 1/222* (2013.01);
(Continued)

(58) Field of Classification Search
CPC .......... B64G 1/222; E04B 1/343; E04C 3/005
See application file for complete search history.

(56) References Cited

U.S. PATENT DOCUMENTS 2,599,944 A    6/1952  Salisbury et al.
3,152,260 A   10/1964  Cummings
(Continued)

FOREIGN PATENT DOCUMENTS

CA    2833826 A1    11/2012
CA    2833862 A1     5/2014
(Continued)

OTHER PUBLICATIONS

"DuPont Kapton: Polyimide Film", kapton.dupont.com, Mar. 2012, H-38479-9, 7 pgs.
(Continued)

*Primary Examiner* — Patrick J Maestri
(74) *Attorney, Agent, or Firm* — KPPB LLP

(57) ABSTRACT

Multi-functional coilable thin-walled structures that can be implemented within space-based satellite modules, and methods for their manufacture are provided. Multi-functional coilable thin-walled structures are comprised of at least one longeron that is capable of rolling and collapsing upon itself. In some embodiments, the coilable thin-walled longeron is a flange longeron. The flange longeron contains at least two major regions: a web and a plurality of flanges. The web region comprises portions of flanges that are bonded to one another. The plurality of flanges separate from one another on the same end of the web region. The plurality of flanges are similar in thickness and shape.

22 Claims, 30 Drawing Sheets

(51) Int. Cl.
  *B64G 1/22* (2006.01)
  *B32B 5/02* (2006.01)
  *B32B 5/12* (2006.01)
  *B65H 18/28* (2006.01)
  *B65H 75/14* (2006.01)
  *B65H 19/22* (2006.01)
  *B64G 1/10* (2006.01)
  *E04C 3/00* (2006.01)
  *H02S 30/20* (2014.01)

(52) U.S. Cl.
  CPC ......... *B65H 18/28* (2013.01); *B65H 19/2246* (2013.01); *B65H 75/14* (2013.01); *B32B 2262/101* (2013.01); *B32B 2262/106* (2013.01); *B64G 1/10* (2013.01); *E04B 1/343* (2013.01); *E04C 3/005* (2013.01); *H02S 30/20* (2014.12)

(56) References Cited

U.S. PATENT DOCUMENTS

| | | |
|---|---|---|
| 3,419,433 A | 12/1968 | Slifer, Jr. |
| 3,427,200 A | 2/1969 | Lapin et al. |
| 3,433,677 A | 3/1969 | Robinson et al. |
| 3,437,527 A | 4/1969 | Webb |
| 3,457,427 A | 7/1969 | Tarneja et al. |
| 3,489,915 A | 1/1970 | Engelhardt et al. |
| 3,530,009 A | 9/1970 | Linkous et al. |
| 3,532,299 A | 10/1970 | Williamson et al. |
| 3,562,020 A | 2/1971 | Blevins |
| 3,611,652 A | 10/1971 | Rabenhorst et al. |
| 3,616,528 A | 11/1971 | Goldsmith et al. |
| 3,627,585 A | 12/1971 | Dollery et al. |
| 3,636,539 A | 1/1972 | Gaddy |
| 3,698,958 A | 10/1972 | Williamson et al. |
| 3,730,457 A | 5/1973 | Williams et al. |
| 3,735,943 A * | 5/1973 | Fayet ............... B64G 1/222 244/172.7 |
| 3,758,051 A | 9/1973 | Williams |
| 3,781,647 A | 12/1973 | Glaser |
| 3,785,590 A * | 1/1974 | Wentworth .......... B64G 1/443 244/1 R |
| 3,793,082 A | 2/1974 | Roger |
| 3,805,622 A | 4/1974 | Kinard |
| 3,809,337 A | 5/1974 | Andrews et al. |
| 3,817,477 A | 6/1974 | Luther et al. |
| 3,848,821 A | 11/1974 | Scheel |
| 3,863,870 A | 2/1975 | Andrews et al. |
| 3,952,324 A | 4/1976 | Wolff et al. |
| 3,989,994 A | 11/1976 | Brown |
| 4,078,747 A | 3/1978 | Minovitch |
| 4,116,258 A | 9/1978 | Slysh et al. |
| 4,133,501 A | 1/1979 | Pentlicki |
| 4,151,872 A | 5/1979 | Slysh et al. |
| 4,153,474 A | 5/1979 | Rex |
| 4,155,524 A | 5/1979 | Marello et al. |
| 4,234,856 A | 11/1980 | Jung et al. |
| 4,282,394 A | 8/1981 | Lackey et al. |
| 4,328,389 A | 5/1982 | Stern et al. |
| 4,415,759 A | 11/1983 | Copeland et al. |
| 4,416,052 A | 11/1983 | Stern |
| 4,419,532 A | 12/1983 | Severns |
| 4,687,880 A | 8/1987 | Morris |
| 4,735,488 A | 4/1988 | Rancourt et al. |
| 4,780,726 A | 10/1988 | Archer et al. |
| 4,784,700 A | 11/1988 | Stern et al. |
| 4,789,989 A | 12/1988 | Stern et al. |
| 4,947,825 A | 8/1990 | Moriarty |
| 4,953,190 A | 8/1990 | Kukoleck et al. |
| 5,013,128 A | 5/1991 | Stern et al. |
| 5,114,101 A | 5/1992 | Stern et al. |
| 5,131,955 A | 7/1992 | Stern et al. |
| 5,154,777 A | 10/1992 | Blackmon et al. |
| 5,177,396 A | 1/1993 | Gielen et al. |
| 5,180,441 A | 1/1993 | Cornwall et al. |
| 5,226,107 A | 7/1993 | Stern et al. |
| 5,280,441 A | 1/1994 | Wada et al. |
| 5,309,925 A | 5/1994 | Policastro |
| 5,310,141 A | 5/1994 | Homer et al. |
| 5,337,980 A | 8/1994 | Homer et al. |
| 5,344,496 A | 9/1994 | Stern et al. |
| 5,404,868 A | 4/1995 | Sankrithi |
| 5,428,483 A | 6/1995 | Sato et al. |
| 5,487,791 A | 1/1996 | Everman et al. |
| 5,496,414 A | 3/1996 | Harvey et al. |
| 5,502,451 A | 3/1996 | Rainville et al. |
| 5,512,913 A | 4/1996 | Staney |
| 5,520,747 A | 5/1996 | Marks |
| 5,569,332 A | 10/1996 | Glatfelter et al. |
| 5,623,119 A | 4/1997 | Yater et al. |
| 5,653,222 A | 8/1997 | Newman |
| 5,666,127 A | 9/1997 | Kochiyama et al. |
| 5,785,280 A | 7/1998 | Baghdasarian |
| 5,885,367 A | 3/1999 | Brown et al. |
| 5,909,299 A | 6/1999 | Sheldon, Jr. et al. |
| 5,909,860 A | 6/1999 | Lee et al. |
| 5,969,695 A | 10/1999 | Bassily et al. |
| 5,984,484 A | 11/1999 | Kruer |
| 6,017,002 A | 1/2000 | Burke et al. |
| 6,031,178 A | 2/2000 | Kester |
| 6,043,425 A | 3/2000 | Assad |
| 6,050,526 A | 4/2000 | Stribling |
| 6,060,790 A | 5/2000 | Craig, Jr. |
| 6,091,017 A | 7/2000 | Stern |
| 6,118,067 A | 9/2000 | Lashley et al. |
| 6,150,995 A | 11/2000 | Gilger |
| 6,188,012 B1 | 2/2001 | Ralph |
| 6,194,790 B1 | 2/2001 | Griffin et al. |
| 6,195,067 B1 | 2/2001 | Gilger |
| 6,284,967 B1 | 9/2001 | Hakan et al. |
| 6,300,558 B1 | 10/2001 | Takamoto et al. |
| 6,343,442 B1 | 2/2002 | Marks |
| 6,366,255 B1 | 4/2002 | Chiang |
| 6,366,256 B1 | 4/2002 | Ramanujam et al. |
| 6,369,545 B1 | 4/2002 | Williams et al. |
| 6,394,395 B1 | 5/2002 | Poturalski et al. |
| 6,423,895 B1 | 7/2002 | Murphy |
| 6,429,368 B1 | 8/2002 | Summers |
| 6,528,716 B2 | 3/2003 | Collette et al. |
| 6,534,705 B2 | 3/2003 | Berrios et al. |
| 6,541,916 B2 | 4/2003 | Decker |
| 6,547,190 B1 | 4/2003 | Thompson et al. |
| 6,555,740 B2 | 4/2003 | Roth et al. |
| 6,557,804 B1 | 5/2003 | Carroll |
| 6,560,942 B2 | 5/2003 | Warren et al. |
| 6,565,044 B1 | 5/2003 | Johnson et al. |
| 6,577,130 B1 | 6/2003 | Adamo et al. |
| 6,587,263 B1 | 7/2003 | Iacovangelo et al. |
| 6,590,150 B1 | 7/2003 | Kiefer |
| 6,635,507 B1 | 10/2003 | Boutros et al. |
| 6,655,638 B2 | 12/2003 | Deel |
| 6,660,927 B2 | 12/2003 | Zwanenburg |
| 6,660,928 B1 | 12/2003 | Patton et al. |
| 6,689,952 B2 | 2/2004 | Kawaguchi |
| 6,690,252 B2 | 2/2004 | Scoltock, Jr. et al. |
| 6,713,670 B2 | 3/2004 | Stern et al. |
| 6,735,838 B1 | 5/2004 | Triller et al. |
| 6,735,920 B1 | 5/2004 | Cadogan |
| 6,768,048 B2 | 7/2004 | Woll et al. |
| 6,784,359 B2 | 8/2004 | Clark et al. |
| 6,799,742 B2 | 10/2004 | Nakamura et al. |
| 6,882,072 B2 | 4/2005 | Wingett et al. |
| 6,897,730 B2 | 5/2005 | Dupuis et al. |
| 6,903,261 B2 | 6/2005 | Habraken et al. |
| 6,904,749 B2 | 6/2005 | Joshi et al. |
| 6,909,042 B2 | 6/2005 | Geyer et al. |
| 6,936,760 B2 | 8/2005 | Spirnak et al. |
| 6,983,914 B2 | 1/2006 | Stribling et al. |
| 7,006,039 B2 | 2/2006 | Miyamoto et al. |
| 7,053,294 B2 | 5/2006 | Tuttle et al. |
| 7,077,361 B1 | 7/2006 | Rabinowitz |
| 7,138,960 B2 | 11/2006 | Carroll et al. |
| 7,163,179 B1 | 1/2007 | Taylor |

(56) References Cited

U.S. PATENT DOCUMENTS

| | | | |
|---|---|---|---|
| 7,211,722 B1 | 5/2007 | Murphy | |
| 7,271,333 B2 | 9/2007 | Fabick et al. | |
| 7,301,095 B2 | 11/2007 | Murphy et al. | |
| 7,303,166 B2 | 12/2007 | Geery | |
| 7,319,189 B2 | 1/2008 | Ruelle et al. | |
| 7,354,033 B1 | 4/2008 | Murphey et al. | |
| 7,392,011 B1 | 6/2008 | Jacomb-Hood | |
| 7,464,895 B2 | 12/2008 | Palmer | |
| 7,474,249 B1 | 1/2009 | Williams et al. | |
| 7,486,431 B2 | 2/2009 | Rabinowitz | |
| 7,564,149 B2 | 7/2009 | Siri et al. | |
| 7,564,628 B2 | 7/2009 | Barth et al. | |
| 7,568,479 B2 | 8/2009 | Rabinowitz | |
| 7,612,284 B2 | 11/2009 | Rogers et al. | |
| 7,736,007 B2 | 6/2010 | Rabinowitz | |
| 7,866,836 B2 | 1/2011 | Rabinowitz | |
| 7,878,667 B2 | 2/2011 | Rabinowitz | |
| 7,895,795 B1 * | 3/2011 | Murphey | E04C 3/28 52/108 |
| 7,960,641 B2 | 6/2011 | Rabinowitz | |
| 8,071,873 B2 | 12/2011 | Rabinowitz | |
| 8,146,867 B2 | 4/2012 | Jordan et al. | |
| 8,215,298 B2 | 7/2012 | Klotz | |
| 8,308,111 B2 | 11/2012 | Lu et al. | |
| 8,356,774 B1 | 1/2013 | Banik et al. | |
| 8,439,511 B2 | 5/2013 | Stern et al. | |
| 8,616,502 B1 | 12/2013 | Stribling et al. | |
| 8,636,253 B1 | 1/2014 | Spence et al. | |
| 8,683,755 B1 | 4/2014 | Spence et al. | |
| 8,872,018 B1 | 10/2014 | Breen et al. | |
| 9,004,410 B1 * | 4/2015 | Steele | B64G 1/44 244/172.7 |
| 9,079,673 B1 | 7/2015 | Steele et al. | |
| 9,120,583 B1 | 9/2015 | Spence et al. | |
| 9,156,568 B1 | 10/2015 | Spence et al. | |
| 9,248,922 B1 | 2/2016 | Baghdasarian et al. | |
| 9,276,148 B2 | 3/2016 | Jaffe et al. | |
| 9,346,566 B2 | 5/2016 | Spence et al. | |
| 9,444,394 B1 | 9/2016 | Thomas et al. | |
| 9,709,349 B2 | 7/2017 | Raman et al. | |
| 9,856,039 B2 | 1/2018 | Abrams et al. | |
| 10,071,823 B2 * | 9/2018 | Turse | B64G 1/222 |
| 10,144,533 B2 | 12/2018 | Atwater et al. | |
| 10,340,698 B2 | 7/2019 | Pellegrino et al. | |
| 10,696,428 B2 | 6/2020 | Pellegrino et al. | |
| 10,992,253 B2 | 4/2021 | Atwater et al. | |
| 11,142,349 B2 | 10/2021 | Barnes | |
| 2002/0007845 A1 | 1/2002 | Collette et al. | |
| 2002/0029796 A1 | 3/2002 | Mikami et al. | |
| 2002/0029797 A1 | 3/2002 | Mikami et al. | |
| 2002/0032992 A1 | 3/2002 | Roth et al. | |
| 2002/0116877 A1 | 8/2002 | Breitbach et al. | |
| 2002/0134423 A1 | 9/2002 | Eller et al. | |
| 2003/0098057 A1 | 5/2003 | Mizuno et al. | |
| 2003/0098058 A1 | 5/2003 | Takada et al. | |
| 2003/0192586 A1 | 10/2003 | Takada et al. | |
| 2003/0196298 A1 | 10/2003 | Hinkley et al. | |
| 2004/0011395 A1 | 1/2004 | Nicoletti et al. | |
| 2004/0140930 A1 | 7/2004 | Harles | |
| 2004/0187912 A1 | 9/2004 | Takamoto et al. | |
| 2004/0231718 A1 | 11/2004 | Umeno et al. | |
| 2005/0046977 A1 | 3/2005 | Shifman | |
| 2005/0178921 A1 | 8/2005 | Stribling et al. | |
| 2005/0241691 A1 | 11/2005 | Wakefield | |
| 2005/0257823 A1 | 11/2005 | Zwanenburg | |
| 2006/0038083 A1 | 2/2006 | Criswell | |
| 2006/0109053 A1 | 5/2006 | Kim et al. | |
| 2006/0157103 A1 | 7/2006 | Sheats et al. | |
| 2006/0186274 A1 | 8/2006 | Wang et al. | |
| 2006/0207189 A1 | 9/2006 | Pryor et al. | |
| 2007/0029446 A1 | 2/2007 | Mosher et al. | |
| 2007/0087704 A1 | 4/2007 | Gilberton | |
| 2008/0000232 A1 | 1/2008 | Rogers et al. | |
| 2008/0055177 A1 | 3/2008 | Dixon | |
| 2008/0088409 A1 | 4/2008 | Okada | |
| 2008/0149162 A1 | 6/2008 | Martinelli et al. | |
| 2008/0173349 A1 | 7/2008 | Liu et al. | |
| 2008/0185039 A1 | 8/2008 | Chan | |
| 2008/0251113 A1 | 10/2008 | Horne et al. | |
| 2008/0283109 A1 | 11/2008 | Mankins et al. | |
| 2009/0126792 A1 | 5/2009 | Gruhlke et al. | |
| 2009/0151769 A1 | 6/2009 | Corbin | |
| 2009/0199893 A1 | 8/2009 | Bita et al. | |
| 2009/0223554 A1 | 9/2009 | Sharps | |
| 2009/0250094 A1 | 10/2009 | Robison et al. | |
| 2009/0301544 A1 | 12/2009 | Minelli | |
| 2009/0308451 A1 | 12/2009 | Oesterle et al. | |
| 2010/0170560 A1 | 7/2010 | Sapienza et al. | |
| 2010/0180946 A1 | 7/2010 | Gruhlke et al. | |
| 2010/0224231 A1 | 9/2010 | Hoke | |
| 2010/0263709 A1 | 10/2010 | Norman et al. | |
| 2010/0269885 A1 | 10/2010 | Benitez et al. | |
| 2010/0276547 A1 | 11/2010 | Rubenchik et al. | |
| 2010/0289342 A1 | 11/2010 | Maness | |
| 2010/0300507 A1 | 12/2010 | Heng et al. | |
| 2010/0319774 A1 | 12/2010 | Schwartz | |
| 2011/0041894 A1 | 2/2011 | Liao | |
| 2011/0049992 A1 | 3/2011 | Sant'Anselmo et al. | |
| 2011/0061718 A1 | 3/2011 | Fork et al. | |
| 2011/0080135 A1 | 4/2011 | Bland | |
| 2011/0100425 A1 | 5/2011 | Osamura et al. | |
| 2011/0120524 A1 | 5/2011 | Wares et al. | |
| 2011/0203574 A1 | 8/2011 | Harding | |
| 2011/0210209 A1 | 9/2011 | Taylor et al. | |
| 2011/0232718 A1 | 9/2011 | Nawab | |
| 2011/0300664 A1 | 12/2011 | Chung et al. | |
| 2011/0315192 A1 | 12/2011 | Swatek et al. | |
| 2012/0019942 A1 | 1/2012 | Morgan et al. | |
| 2012/0024362 A1 | 2/2012 | Gossman | |
| 2012/0031393 A1 | 2/2012 | Linderman et al. | |
| 2012/0125415 A1 | 5/2012 | Tischler | |
| 2012/0138749 A1 | 6/2012 | Ellinghaus | |
| 2012/0138997 A1 | 6/2012 | Tasaki et al. | |
| 2012/0160299 A1 | 6/2012 | Reid et al. | |
| 2012/0243252 A1 | 9/2012 | Kim | |
| 2013/0009851 A1 | 1/2013 | Danesh | |
| 2013/0032673 A1 | 2/2013 | Kobayashi | |
| 2013/0093287 A1 | 4/2013 | Biso et al. | |
| 2013/0099599 A1 | 4/2013 | Jaffe et al. | |
| 2013/0133730 A1 | 5/2013 | Pan et al. | |
| 2013/0220399 A1 | 8/2013 | Gruhlke et al. | |
| 2013/0233974 A1 | 9/2013 | Maiboroda et al. | |
| 2013/0319504 A1 | 12/2013 | Yang et al. | |
| 2013/0319505 A1 | 12/2013 | Yang et al. | |
| 2013/0332093 A1 | 12/2013 | Adest et al. | |
| 2014/0041705 A1 | 2/2014 | Kang et al. | |
| 2014/0083479 A1 | 3/2014 | Takayama et al. | |
| 2014/0102686 A1 | 4/2014 | Yu et al. | |
| 2014/0131023 A1 | 5/2014 | Raman et al. | |
| 2014/0148197 A1 | 5/2014 | Shields | |
| 2014/0158197 A1 | 6/2014 | Rubenstein et al. | |
| 2014/0159636 A1 | 6/2014 | Yang et al. | |
| 2014/0261621 A1 | 9/2014 | Gruhlke et al. | |
| 2014/0261622 A1 | 9/2014 | Floyd et al. | |
| 2014/0263844 A1 | 9/2014 | Cook, Jr. et al. | |
| 2014/0263847 A1 | 9/2014 | Eskenazi et al. | |
| 2014/0326833 A1 | 11/2014 | Spence et al. | |
| 2014/0356613 A1 | 12/2014 | Weisenberger et al. | |
| 2015/0022909 A1 | 1/2015 | O'Neill | |
| 2015/0053253 A1 | 2/2015 | O'Neill | |
| 2015/0130293 A1 | 5/2015 | Hajimiri et al. | |
| 2015/0144740 A1 | 5/2015 | Turse et al. | |
| 2015/0155413 A1 | 6/2015 | Pokharna et al. | |
| 2015/0217876 A1 | 8/2015 | Halsband | |
| 2016/0056321 A1 | 2/2016 | Atwater et al. | |
| 2016/0065006 A1 | 3/2016 | Woods | |
| 2016/0122041 A1 | 5/2016 | Abrams et al. | |
| 2016/0164451 A1 | 6/2016 | Lenert et al. | |
| 2016/0311558 A1 | 10/2016 | Turse et al. | |
| 2016/0376037 A1 | 12/2016 | Pellegrino et al. | |
| 2016/0380486 A1 | 12/2016 | Hajimiri et al. | |
| 2016/0380580 A1 | 12/2016 | Atwater et al. | |
| 2017/0021947 A1 | 1/2017 | Pellegrino et al. | |
| 2017/0025992 A1 | 1/2017 | Atwater et al. | |

(56) References Cited

U.S. PATENT DOCUMENTS

| | | |
|---|---|---|
| 2017/0047463 A1 | 2/2017 | Hajimiri et al. |
| 2017/0047886 A1 | 2/2017 | Atwater et al. |
| 2017/0047889 A1 | 2/2017 | Atwater et al. |
| 2017/0047987 A1 | 2/2017 | Pellegrino et al. |
| 2017/0063296 A1 | 3/2017 | Cruijssen et al. |
| 2018/0313083 A1* | 11/2018 | Murphey ................. E04C 3/28 |
| 2018/0315877 A1 | 11/2018 | Kelzenberg et al. |
| 2020/0130868 A1 | 4/2020 | Pellegrino et al. |
| 2020/0130872 A1 | 4/2020 | Spencer et al. |

FOREIGN PATENT DOCUMENTS

| | | |
|---|---|---|
| CN | 104158471 A | 11/2014 |
| EP | 0541052 A1 | 5/1993 |
| EP | 0977273 A1 | 2/2000 |
| EP | 0996170 A2 | 4/2000 |
| EP | 1501132 A2 | 1/2005 |
| EP | 976655 B1 | 9/2005 |
| EP | 1852919 A2 | 11/2007 |
| EP | 1852919 A3 | 2/2009 |
| EP | 2318045 A1 | 5/2011 |
| EP | 3325347 A1 | 5/2018 |
| EP | 3334655 A1 | 6/2018 |
| EP | 3325347 B | 6/2021 |
| FR | 2956774 A1 | 8/2011 |
| GB | 2247564 A | 3/1992 |
| JP | 6298781 A | 5/1987 |
| JP | S63254772 A | 10/1988 |
| JP | H0369258 U | 7/1991 |
| JP | H05107328 A | 4/1993 |
| JP | H06253477 A | 9/1994 |
| JP | 082500 A | 9/1996 |
| JP | 2000114571 A | 4/2000 |
| JP | 2001088799 A | 4/2001 |
| JP | 2001309581 A | 11/2001 |
| JP | 2002362500 A | 12/2002 |
| JP | 2003164077 A | 6/2003 |
| JP | 2003164078 A | 6/2003 |
| JP | 2003191899 A | 7/2003 |
| JP | 2004090817 A | 3/2004 |
| JP | 2004196051 A | 7/2004 |
| JP | 2004253471 A | 9/2004 |
| JP | 2004296658 A | 10/2004 |
| JP | 2009184603 A | 8/2009 |
| JP | 2010259301 A | 11/2010 |
| JP | 6715317 B2 | 6/2020 |
| WO | 2004049538 A2 | 6/2004 |
| WO | 2008073905 A2 | 6/2008 |
| WO | 2010033632 A2 | 3/2010 |
| WO | 2011006506 A1 | 1/2011 |
| WO | 2011062785 A2 | 5/2011 |
| WO | 2011067772 A1 | 6/2011 |
| WO | 2011109275 A1 | 9/2011 |
| WO | 2011062785 A3 | 11/2011 |
| WO | 2015175839 | 11/2015 |
| WO | 2015175839 A1 | 11/2015 |
| WO | 2015179213 A2 | 11/2015 |
| WO | 2015179214 A2 | 11/2015 |
| WO | 2015187221 A2 | 12/2015 |
| WO | 2015187739 | 12/2015 |
| WO | 2017015508 | 1/2017 |
| WO | 2017015605 | 1/2017 |
| WO | 2017027615 | 2/2017 |
| WO | 2017027617 | 2/2017 |
| WO | 2017027629 | 2/2017 |
| WO | 2017027633 | 2/2017 |

OTHER PUBLICATIONS

"ESA. Composite material structures.", printed Jun. 29, 2017 from http://www.esa.int/Our_Activities/Space_Engineering_Technology/Structures/Composite_Materials_structures, Oct. 20, 2014, 2 pgs.

"Orbital ATK", Coilable Boom Systems. Technical report, Oct. 18, 1989, 2 pgs.

"Space solar power limitless clean energy from space", National Space Society, printed Jun. 29, 2017 from http://www.nss.org/settlement/ssp/, May 2017, 11 pgs.

Aguirre-Martinez et al., "Development of a Continuous Manufacturing Method for a Deployable Satellite Mast in Cfrp", 15th Reinforced Plastics Congress 1986., (September), pp. 107-110, 1986.

Aieta et al., "Aberration-Free Ultrathin Flat Lenses and Axicons at Telecom Wavelengths Based on Plasmonic Metasurfaces", Nano Lett., Web publication date Aug. 2012, vol. 12, No. 9, pp. 4932-4936.

Aieta et al., "Multiwavelength achromatic metasurfaces by dispersive phase compensation", Science, Mar. 20, 2015, vol. 347, No. 6228, pp. 1342-1345, doi: 10.1126/science.aaa2494.

Amacher et al., "Thin ply composites: Experimental characterization and modeling of size-effects", Composites Science and Technology, Jul. 11, 2014, vol. 101, pp. 121-132.

Andryieuski et al., "Rough metal and dielectric layers make an even better hyperbolic metamaterial absorber", Optics Express, Jun. 11, 2014, vol. 22, No. 12, pp. 14975-14980.

Aoki et al., "A Fully Integrated Quad-Band GSM/GPRS Power Amplifier", IEEE Journal of Solid-State Circuits, vol. 43, Issue 12, Dec. 12, 2008, pp. 2747-2758.

Arai, "Pitch-based carbon fiber with low modulus and high heat conduction", Nippon Steel Technical Report No. 84, Jul. 11, 2001, pp. 12-17.

Arbabi, et al., "Multiwavelength polarization insensitive lenses based on dielectric metasurfaces with meta-molecules", Optics, Jan. 22, 2016, vol. 3, Issue 6, pp. 628-633.

Arbabi, et al., "Subwavelength-thick lenses with high numerical apertures and large efficiency based on high-contrast transmitarrays", Nature Communications, May 5, 2015, vol. 6, pp. 7069, doi:10.1038/ncomms8069.

Arbabi et al., "Dielectric Metasurfaces for Complete Control of Phase and Polarization with Subwavelength Spatial Resolution and High Transmission", Nature Nanotechnology, Aug. 31, 2015, 27 pgs., doi:10.1038/nnano.2015.186.

Arya, "Packaging and Deployment of Large Planar Spacecraft Structures", Thesis of Manan Arya, May 2, 2016, 131 pgs.

Arya et al., "Ultralight Structures for Space Solar Power Satellites", American Institute of Aeronautics and Astronautics, 2016, pp. 1-18.

Arya et al., "Wrapping Thick Membranes with Slipping Folds", American Institute of Aeronautics and Astronautics, date unknown, pp. 1-17.

Bakr et al., "Impact of phase and amplitude errors on array performance", UC Berkeley Technical Report No. UCB/EECS-2009-1. Retrieved from http://www.eecs.berkeley.com/Pubs/TechRpts/2009/EECS-2009-1.html, Jan. 1, 2009, 12 pgs.

Banik et al., "Performance Validation of the Triangular Rollable and Collapsible Mast", Proceedings of the 24th Annual AIAA/USU Conference on Small Satellites, Logan, UT, Aug. 9, 2010, 8 pgs.

Banik et al., "Verification of a Retractable Solar Sail in a Thermal-Vacuum Environment", 51st AIAA/ASME/ASCE/AHS/ASC Structures, Structural Dynamics, and Materials Conference, Apr. 12-15, 2010, Orlando, Florida, doi: 10.2514/6.2010-2585.

Bapanapalli et al., "The Effect of Tool-Part Interactions on the Geometry of Laminated Composites", Washington State University, Jul. 10, 2016.

Biddy et al., "LightSail-1 solar sail design and qualification", Proceedings of the 41st Aerospace Mechanisms Symposium, May 16, 2012, pp. 451-463.

Bohn et al., "Fully Integrated Frequency and Phase Generation for a 6-18GHz Tunable Multi-Band Phased-Array Receiver in CMOS", Radio Frequency Integrated Circuits Symposium (RFIC), Apr. 17-Jun. 17, 2008. IEEE, pp. 439-442.

Borriello et al., "Ab initio investigation of hybrid organic-inorganic perovskites based on tin halides", Physical Review B, Jun. 23, 2008, vol. 77, 235214, 9 pgs.

Brongersma et al., "Light management for photovoltaics using high-index nanostructures", Nature Materials, vol. 13, No. 25, May 2014, pp. 451-460.

(56) References Cited

OTHER PUBLICATIONS

Cahill et al., "Nanoscale thermal transport. II. 2003-2012", Applied Physics Review, Jan. 14, 2014, vol. 1, No. 1, pp. 011305-1-011305-45.

Calladine et al., "The theory of thin shell structures 1888-1988", Proceedings of the Institution of Mechanical Engineers, Part A: Journal of Power and Energy, vol. 202, No. 3, Jan. 7, 1988, pp. 141-149.

Callahan et al., "Light trapping in ultrathin silicon photonic crystal superlattices with randomly-textured dielectric incouplers", Optics Express, vol. 21, Issue 25, DOI: 10.1364/OE.21.030315, 2013, pp. 30315-30326.

Campbell et al., "A Pixel Readout Chip for Mrad in Standard 0.25um CMOS", IEEE Transactions on Nuclear Science, vol. 46, issue: 3, Jun. 1999, pp. 156-160.

Cao et al., "A 4.5MGy TID-Tolerant CMOS Bandgap Reference Circuit Using a Dynamic Base Leakage Compensation Technique", IEEE Transactions on Nuclear Science, vol. 60, issue 4, Aug. 2013, pp. 2819-2824.

Castle Jr., "Heat conduction in carbon materials", 1st Biennial Conference of the American Carbon Society, pp. 13-19, Nov. 2, 1953.

Chen et al., "Planar Heterojunction Perovskite Solar Cells via Vapor-Assisted Solution Process", Journal of the American Chemical Society 136, Dec. 20, 2013, pp. 622-625.

Cheng et al., "Optical metasurfaces for beam scanning in space", Optics Letters, May 1, 2014, vol. 39, No. 9, pp. 2719-2722.

Conings et al., "Intrinsic thermal instability of methylammonium lead trihalide perovskite", Advanced Energy Materials, Jun. 2, 2015, DOI: 10.1002/aenm.201500477, 8 pgs.

David, "Extraterrestrial mining could reap riches and spur exploration", http://www.space.com/16273-extraterrestrial-mining-asteroids-moon.html, Jun. 25, 2012, 7 pgs.

Delapierre et al., "Spin-Stabilized Membrane Antenna Structures", American Institute of Aeronautics and Astronautics, date unknown, pp. 1-15.

Du Toit et al., "Advances in the design of Jaumann absorbers", in Antennas and Propagation Society International Symposium, 1990. AP-S. Merging Technologies for the 90's. Digest., May 7, 1990, vol. 3, pp. 1212-1215.

Elfiky et al., "Study the effects of proton irradiation on GaAs/Ge solar cells", 35th IEEE Photovoltaic Specialist Conference, Jul. 2010, pp. 002528-002532.

Emerson, "Electromagnetic wave absorbers and anechoic chambers through the years", IEEE Trans. Antennas Propag., vol. 21, No. 4, Jul. 1973, pp. 484-490.

Eperon et al., "Morphological Control for High Performance, Solution-Processed Planar Heterojunction Perovskite Solar Cells", Advanced Functional Materials 24, first published Sep. 9, 2013, pp. 151-157.

Ersoy et al., "An experimental method to study the frictional processes during composites manufacturing", Composites Part A: Applied Science and Manufacturing, Feb. 19, 2005, vol. 36, No. 11, pp. 1536-1544.

Estvanko et al., "Numerical analysis of a tape spring hinge folded about two axes", Earth and Space 2012 © Engineering, Science, Construction, and Operations in Challenging Environments, ASCE, Jul. 11, 2012, pp. 714-721.

Fallahi et al., "Thin wideband radar absorbers", Transactions on Antennas and Propagation, Nov. 30, 2010, vol. 58, No. 12, pp. 4051-4058.

Fante et al., "Reflection properties of the Salisbury screen", IEEE Transactions on Antennas and Propagation, Oct. 1988, vol. 36, No. 10, pp. 1443-1454.

Fernandez, "Advanced Deployable Shell-Based Composite Booms For Small Satellite Structural Applications Including Solar Sails", International Symposium on Solar Sailing, Jan. 17-20, 2017, Kyoto, Japan, 19 pgs.

Fernlund, "Experimental and numerical study of the effect of cure cycle, tool surface, geometry, and lay-up on the dimensional fidelity of autoclave-processed composite parts", Composites—Part A: Applied Science and Manufacturing, 33(3):341-351, 2002.

Geisz et al., "Infrared Reflective and Transparent Inverted Metamorphic Triple Junction Solar Cells", AIP Conference Proceedings, vol. 1277, Issue 11, pp. 11-15, Nov. 14, 2010.

Herbeck et al., "Development and test of deployable ultra-lightweight CFRP-booms for a Solar Sail", European Space Agency, (Special Publication) ESA SP, 49(468):107-112, 2001.

Rephaeli et al., "Absorber and emitter for solar thermo-photovoltaic systems to achieve efficiency exceeding the Shockley-Queisser limit", Optics. Express, Aug. 11, 2009, vol. 17, No. 17, pp. 15145-15159.

Rephaeli et al., "Ultrabroadband Photonic Structures To Achieve High-Performance Daytime Radiative Cooling", Nano Letters, vol. 13, Mar. 5, 2013, pp. 1457-1461.

Roybal et al., "Development of an Elastically Deployable Boom for Tensioned Planar Structures", American Institute of Aeronautics and Astronautics, Apr. 23-26, 2007, 48th AIAA/ASME/ASCE/AHS/ASC Structures, Structural Dynamics, and Materials Conference, doi: 10.2514/6.2007-1838.

Rubenchik et al., "Solar Power Beaming: From Space to Earth", U.S. Department of Energy Office of Scientific and Technical Information, Apr. 14, 2009, Technical Report LLNL-TR-412782, 16 pgs. DOI: 10.2172/952766.

Santer et al., "Composite Tube Flexures at Nanosatellite Scale", 4th AIAA Space-craft Structures Conference, Jan. 9-13, 2017, 12 pgs.

Sasaki, "How Japan plans to build an orbital solar farm", printed from https://energy.gov/articles/space-based-solar-power, published Apr. 24, 2014.

Sasaki et al., "A new concept of solar power satellite: Tethered-SPS", Acta Astronautica, 2006, vol. 60, pp. 153-165, doi:10.1016/j.actaastro.2006.07.010.

Sato et al., "Modeling of degradation behavior of InGaP/GaAs/Ge triple-junction space solar cell exposed to charged particles", Journal of Applied Physics, vol. 105, 2009, pp. 044504-1-044504-6.

Scholl et al., "Quantum plasmon resonances of individual metallic nanoparticles", Nature, Mar. 22, 2012, vol. 483, doi:10.1038/nature10904, pp. 421-428.

Seffen et al., "Deployment dynamics of tape springs", Proceedings of the Royal Society of London A: Mathematical, Physical and Engineering Sciences, Mar. 9, 1999, vol. 455, pp. 1003-1048.

Shaltout et al., "Time-varying metasurfaces and Lorentz non-reciprocity", Optical Materials Express, Nov. 1, 2015, vol. 5, No. 11, pp. 2459-2467.

Shin-Etsu, "Meeting the increasingly diverse and sophisticated needs of industry with the unique properties of silicone rubbers", Characteristic properties of Silicone Rubber Compounds, 2013, 16 pgs.

Sickinger et al., "Lightweight deployable booms: Design, manufacture, verification, and smart materials application", 55th International Astronautical Congress, Vancouver, Canada, Oct. 4-8, 2004, pp. 1-11.

Sihn et al., "Experimental studies of thin-ply laminated composites", Composites Science and Technology, May 1, 2007, vol. 67, pp. 996-1008.

Silva et al., "Performing Mathematical Operations with Metamaterials", Science, Jan. 10, 2014, vol. 343, No. 6167, pp. 160-163.

Silverman et al., "Outdoor Performance of a Thin-Film Gallium-Arsenide Photovoltaic Module", presented at the 39th IEEE Photovoltaic Specialist Conference, Conference Jun. 16-21, 2013, Tampa, Florida, USA, 6 pgs.

Snoeys et al., "Integrated Circuits for Particle Physics Experiments", IEEE Journal Solid-State Circuits, vol. 35, issue 12, Dec. 2000, pp. 2018-2030.

Stabile et al., "Coiling dynamic analysis of thin-walled composite deployable boom", Composite Structures, Mar. 29, 2014, vol. 113, pp. 429-436.

Steeves, "Multilayer Active Shell Mirrors", Thesis of John Steeves, May 5, 2015, 164 pgs.

Stohlman et al., "Thermal Deformation of Very Slender Triangular Rollable and Collapsible Booms", 3rd AIAA Spacecraft Structures Conference, San Diego, California, 2016, pp. 2016-1469.

(56) References Cited

OTHER PUBLICATIONS

Streyer et al., "Strong absorption and selective emission from engineered metals with dielectric coatings", Optics Express, Apr. 8, 2013, vol. 21, No. 7, pp. 9113-9122.
Stuart et al., "Absorption enhancement in silicon-on-insulator waveguides using metal island films,", Appl. Phys. Lett., Oct. 14, 1996, vol. 69, No. 16, pp. 2327-2329.
Stuart et al., "Island size effects in nanoparticle-enhanced photodetectors", Appl. Phys. Lett., Dec. 28, 1998, vol. 73, No. 26, pp. 3815-3817.
Svanberg et al., "An experimental investigation on mechanisms for manufacturing induced shape distortions in homogeneous and balanced laminates", Composites—Part A: Applied Science and Manufacturing, Jun. 1, 2001, vol. 32, pp. 827-838.
Torayca, "T800H Technical Data Sheet", Technical report No. CFA-007, 2 pgs.
Tsai et al., "High-efficiency two-dimensional Ruddlesden-Popper perovskite solar cells", Nature, Aug. 18, 2016, vol. 536, doi:10. 1038/nature18306, 15 pgs.
Vaccaro et al., "In-flight experiment for combined planar antennas and solar cells (SOLANT)", IET Microwaves Antennas & Propaga, vol. 3, No. 8, Dec. 1, 2009 (Dec. 1, 2009), pp. 1279-1287.
Walker et al., "An investigation of tape spring fold curvature", Proceedings of the 6th International Conference on Dynamics and Control of Systems and Structures in Space, Citeseer, 2004, 10 pgs.
Walters et al., "Spenvis implementation of end-of-life solar cell calculations using the displacement damage dose methodology", in the Proceedings of the 19th Space Photovoltaic Research and Technology Conference, Feb. 1, 2007, 9 pgs.
Wang et al., "A Broadband Self-Healing Phase Synthesis Scheme", Radio Frequency Integrated Circuits Symposium (RFIC), IEEE, Jun. 5-7, 2011, 4 pgs.
Weinberg et al., "Radiation and temperature effects in gallium arsenide, indium phosphide, and silicon solar cells", NASA Technical Memorandum 89870, Washington, D.C., May 4-8, 1987, 14 pgs.
Wells et al., "Metamaterials-based Salisbury screens with reduced angular sensitivity", Appl. Phys. Lett., Oct. 21, 2014, vol. 105, pp. 161105-1-161105-4.
White et al., "Cure Cycle Optimization for the Reduction of Processing-Induced Residual Stresses in Composite Materials", Journal of Composite Materials, Dec. 1, 1993, vol. 27, No. 14, pp. 1352-1378.
Whorton et al., "Nanosail-D: the first flight demonstration of solar sails for nanosatellites", 22nd AIAA/USU Conference on Small Satellites, Aug. 11, 2008, pp. 1-6.
Wood, "Space-based solar power", printed Jul. 5, 2017 from https:// energy.gov/articles/space-based-solar-power, Mar. 6, 2014, 7 pgs.
Wu et al., "Retarding the crystallization of PbI2 for highly reproducible planar-structured perovskite solar cells via sequential deposition", Energy & Environmental Science 7, Jun. 24, 2014, pp. 2934-2938.
Yamaguchi, "Radiation-resistant solar cells for space use", Solar Energy Materials & Solar Cells, 2001, vol. 68, pp. 31-53.
Yamaguchi et al., "Correlations for damage in diffused-junction InP solar cells induced by electron and proton irradiation", Journal of Applied Physics, May 1, 1997, vol. 81, No. 9, 6013-6018.
Yamaguchi et al., "Mechanism for the anomalous degradation of Si solar cells induced by high fluence 1 MeV electron irradiation", Applied Physics Letters, May 27, 1996, vol. 68, No. 22, pp. 3141-3143.
Yu et al., "A Broadband, Background-Free Quarter-Wave Plate Based on Plasmonic Metasurfaces", Nano Letters, Nov. 3, 2012, vol. 12, No. 12, pp. 6328-6333.
Yu et al., "Flat optics with designer metasurfaces", Nature Materials, 2014, vol. 13, pp. 139-150.
Zhang et al., "Infrared Refractive Index and Extinction Coefficient of Polyimide Films", International Journal of Thermophysics, May 1, 1998, vol. 19, No. 3, pp. 905-916.
Zhang et al., "Intrinsic instability of the hybrid halide perovskite semiconductor CH3NH3PbI3", Chinese Physics Letters, Jun. 3, 2015, vol. 35, No. 3, 036104, 11 pgs.
Zheng et al., "Metasurface holograms reaching 80% efficiency", Nature Nanotechnology, published online Feb. 23, 2015, pp. 1-6.
Zhu et al., "Radiative cooling of solar cells", Optica, Jul. 22, 2014, vol. 1, pp. 32-38.
Zhu et al., "Radiative cooling of solar absorbers using a visibly transparent photonic crystal thermal blackbody", PNAS, Oct. 6, 2015, vol. 112, pp. 12282-12287.
ATI Industrial, Multi-Axis Force / Torque Sensor, ATI Industrial Automation, Jul. 23, 2014, pp. 1-44.
DuPont Kapton, Mar. 2012, 26 pgs.
Extended European Search Report for European Application No. 15795587.3, Search completed Feb. 5, 2018, dated Feb. 12, 2018, 7 pgs.
Extended European Search Report for European Application No. 15803447.0, Search completed Oct. 17, 2017, dated Oct. 25, 2017, 10 pgs.
Extended European Search Report for European Application No. 16828571.6, Search completed Mar. 18, 2019, dated Mar. 22, 2019, 17 pgs.
Extended European Search Report for European Application No. 16835856.2, Search completed Feb. 22, 2019 dated Mar. 1, 2019, 8 pgs.
International Preliminary Report on Patentability for International Application PCT/US2015/030895, issued Nov. 15, 2016, dated Nov. 24, 2016, 12 pgs.
International Preliminary Report on Patentability for International Application PCT/US2015/030900, issued Nov. 15, 2016, dated Nov. 24, 2016, 9 pgs.
International Preliminary Report on Patentability for International Application PCT/US2015/030909, issued Nov. 15, 2016, dated Nov. 24, 2016, 11 pgs.
International Preliminary Report on Patentability for International Application PCT/US2015/033841, issued Dec. 6, 2016, dated Dec. 15, 2016, 8 pgs.
International Preliminary Report on Patentability for International Application PCT/US2016/043424, issued May 15, 2018, dated May 24, 2018, 12 pgs.
International Preliminary Report on Patentability for International Application PCT/US2016/043677, Report issued Jan. 23, 2018, dated Feb. 1, 2018, 6 pgs.
International Preliminary Report on Patentability for International Application PCT/US2016/046389, Report issued Feb. 13, 2018, dated Feb. 22, 2018, 9 pgs.
International Preliminary Report on Patentability for International Application PCT/US2016/046394, Report issued Feb. 13, 2018, dated Feb. 22, 2018, 10 pgs.
International Preliminary Report on Patentability for International Application PCT/US2016/046415, Report issued Feb. 13, 2018, dated Feb. 22, 2018, 8 pgs.
International Preliminary Report on Patentability for International Application PCT/US2016/046421, Report issued Feb. 13, 2018, dated Feb. 22, 2018, 8 pgs.
International Search Report and Written Opinion for International Application No. PCT/US2015/030895, completed Nov. 27, 2015, dated Nov. 30, 2015, 14 pgs.
International Search Report and Written Opinion for International Application No. PCT/US2015/030909, completed Nov. 27, 2015, dated Nov. 27, 2015, 13 pgs.
International Search Report and Written Opinion for International Application No. PCT/US2016/043424, completed Nov. 15, 2016, dated Nov. 15, 2016, 14 pgs.
International Search Report and Written Opinion for International Application No. PCT/US2016/043677, completed Oct. 21, 2016, dated Oct. 21, 2016, 8 pgs.
International Search Report and Written Opinion for International Application No. PCT/US2016/046389, completed Nov. 22, 2016, dated Nov. 22, 2016, 11 pgs.
International Search Report and Written Opinion for International Application No. PCT/US2016/046394, completed Nov. 17, 2016, dated Nov. 17, 2016, 12 pgs.

(56) References Cited

OTHER PUBLICATIONS

International Search Report and Written Opinion for International Application No. PCT/US2016/046415, completed Nov. 17, 2016, dated Nov. 17, 2016, 10 pgs.
International Search Report and Written Opinion for International Application No. PCT/US2016/046421, completed Nov. 17, 2016, dated Nov. 17, 2016, 10 pgs.
International Search Report and Written Opinion for International Application PCT/US2015/030900, Completed Aug. 11, 2015, dated Aug. 13, 2015, 11 pgs.
International Search Report and Written Opinion for International Application PCT/US2015/033841, Completed Sep. 10, 2015, dated Sep. 11, 2015, 11 pgs.
Smooth on, Mold Max® XLS® II, Jan. 15, 2016, 2 pgs.
"AZ Technology | Materials, Paint and Coatings: AZ-93 White Thermal Control, Electrically Conductive Paint / Coating (AZ's Z-93P)", Available http://www.aztechnology.com/materials-coatings-az-93.html, Accessed: Dec. 19, 2016, 2 pgs.
"Corona Resistant Kapton CR Takes Electrical Insulation Design and Reliability to New Levels", Kapton, DuPont Films, H-54506-1.
"DuPont Kapton 100CRC: Technical Data Sheet", kapton.dupont.com, Jul. 2014, K-28402.
"DuPont Kapton 120FWN616B", kapton.dupont.com, K-28459, Sep. 2014.
"DuPont Kapton 150FCRC019", kapton.dupont.com, K-28402, Jun. 2014.
"DuPont Kapton 150FWN019: Magnet Wire Insulation", www.kapton.dupont.com, H-78319-01, Mar. 2005.
"DuPont Kapton 150FWR019: Insulation Substrate", www.dupont.com/kapton, H-78312, Nov. 2001.
"DuPont Kapton 150PRN411", kapton.com, K-28731, Dec. 2014.
"DuPont Kapton 200FWR919: Insulation Substrate", www.dupont.com/kapton, H-78313, Nov. 2001.
"DuPont Kapton 200RS100", kapton.com, K-15354-2, Sep. 2014.
"DuPont Kapton B: Technical Bulletin", kapton.dupont.com, K-25099-1, Jul. 2013.
"DuPont Kapton FCR: Advanced Magnet Wire Insulation", Jun. 2005, H-99888.
"DuPont Kapton FN: Polyimide Film", kapton.com, K-15347-2, Jun. 2015.
"DuPont Kapton FPC: Polyimide Film", kapton.dupont.com, K-15361, Mar. 2006.
"DuPont Kapton GS Polyimide Film: Technical Data Sheet", kapton.dupont.com, K-26875-1, Jul. 2014.
"DuPont Kapton HN:Polyimide Film", kapton.dupont.com, K-15345-1, Apr. 2011.
"DuPont Kapton HPP-ST: Polyimide Film", kapton.dupont.com, K-15357, Mar. 2006.
"DuPont Kapton MT: Technical Data Sheet", kapton.dupont.com, H-38497-3, Apr. 2014.
"DuPont Kapton PST: Polyimide Film", kapton.dupont.com, K-10790, Nov. 2005.
"DuPont Kapton PV9100 Series: Polyimide Films", kapton.dupont.com, K-26028-1_A4, Oct. 2012.
Hillebrandt et al., "The Boom Design of the De-Orbit Sail Satellite", European Conference on Spacecraft Structures, Materials and Mechanical Testing, European Conference on Spacecraft Structures, Materials & Environmental Testing, Apr. 1-4, 2014, Braunschweig, Germany, 8 pgs.
Huang et al., "Gate-tunable conducting oxide metasurfaces", Nano Letters, vol. 16, No. 9., web publication date Aug. 26, 2016, pp. 5319-5325.
Irwin et al., "Low-Mass Deployable Spacecraft Booms", AIAA Space 2010 Conference & Exposition, pp. 1-11, Aug. 30, 2010.
Jaffe et al., "Development of a Sandwich Module Prototype for Space Solar Power", 2012 IEEE Aerospace Conference, Mar. 3-10, 2012, Big Sky, MT, USA, pp. 1-9 , DOI: 10.1109/AERO.2012.6187077.
Jaffe et al., "Energy Conversion and Transmission Modules for Space Solar Power", Proceedings of the IEEE, Jun. 2013, vol. 101, No. 6, pp. 1424-1437, DOI: 10.1109/JPROC.2013.2252591.
Jang et al., "Tunable large resonant absorption in a midinfrared graphene Salisbury screen", Physical Review. B, Oct. 8, 2014, vol. 90, No. 16, pp. 165409-1-165409-5.
Johnson et al., "NanoSail-D: A Solar Sail Demonstration Mission", Acta Astronautica, 2011, Published Online Mar. 6, 2010, vol. 68 pp. 571-575, doi: 10.1016/j.actaastro.2010.02.008.
Kaltenbrunner et al., "Flexible high power-per-weight perovskite solar cells with chromium oxide-metal contacts for improved stability in air", Nature Materials, vol. 14, doi:10.1038/nmat4388, Aug. 24, 2015, pp. 1032-1039.
Kelly, "On Kirchhoff's law and its generalized application to absorption and emission by cavities", Journal of Research of the National Bureau of Standards—B. Mathematics and Mathematical Physics, Jul.-Sep. 1965, vol. 69B, No. 3, pp. 165-171.
Kildishev et al., "Planar Photonics with Metasurfaces", Science, Mar. 15, 2013, vol. 339, No. 6125, pp. 1232009-1-1232009-6.
Knott et al., "Performance Degradation of Jaumann Absorbers Due to Curvature", IEEE Transactions on Antennas and Propagation, Jan. 1980, vol. AP28, No. 1, pp. 137-139.
Kryder et al., "Heat Assisted Magnetic Recording", Proceeding of the IEEE, current version published Dec. 2, 2008, vol. 96, No. 11, pp. 1810-1835.
Lacoe, R. C. "Improving Integrated Circuit Performance Through the Application of Hardness-by-Design Methodology", IEEE Transactions on Nuclear Science, vol. 55, issue: 4, Aug. 2008, pp. 1903-1925.
Lamoureux et al., "Dynamic kirigami structures for integrated solar tracking", Nature Communications, DOI:10.1038/ncomms9092, Sep. 8, 2015, pp. 1-6.
Leclerc et al., "Characterization of Ultra-Thin Composite Triangular Rollable and Collapsible Booms", 4th AIAA Spacecraft Structures Conference, AIAA SciTech Forum, Jan. 2017, 15 pgs.
Leclerc et al., "Stress Concentration and Material Failure During Coiling of Ultra-Thin TRAC Booms", 2018 AIAA Spacecraft Structures Conference, Jan. 7, 2018, p. 0690, doi: 10.2514/6.2018-0690.
Lee et al., "Non-Destructive Wafer Recycling for Low-Cost Thin-Film Flexible Optoelectronics", Advanced Functional Materials, Apr. 2, 2014, vol. 24, pp. 4284-4291.
Liang et al., "Additive Enhanced Crystallization of Solution-Processed Perovskite for Highly Efficient Planar-Heterojunction Solar Cells", Advanced Materials, Mar. 14, 2014, vol. 26, pp. 3748-3754.
Liu et al., "Microstructure, thermal shock resistance and thermal emissivity of plasma sprayed $LaMAl11\,O19(M=Mg, Fe)$ coatings for metallic thermal protection systems", Applied Surface Science, vol. 271, Feb. 6, 2013, pp. 52-59.
Lohmeyer et al., "Correlation of GEO communication satellite anomalies and space weather phenomena: Improved satellite performance and risk mitigation", paper presented at 30th AIAA International Communications Satellite Systems Conference (ICSSC), Ottawa, Canada, pp. 1-20, Jul. 13, 2012.
Luukkonen et al., "A thin electromagnetic absorber for wide incidence angles and both polarizations", IEEE Transactions on Antennas and Propagation, IEEE Transactions on Antennas and Propagation Jul. 28, 2009, pp. 3119-3125.
Mankins, "A technical overview of the "SunTower" solar power satellite concept", Acta Astronautica, 50(6):369-377, Mar. 1, 2002.
Mankins, "SPS-ALPHA: The First Practical Solar Power Satellite via Arbitrarily Large Phased Array (A 2011-2012 NASA NIAC Phase 1 Project)", Artemis Innovation Management Solutions LLC, Sep. 15, 2012, NIAC Phase 1 Final Report, 113 pgs.
McNutt et al., "Near-Earth Asteroid Scout", American Institute of Aeronautics and Astronautics, AIAA Space 2014 Conference and Exposition, Aug. 4-7, 2014, San Diego, CA, doi: 10.2514/6.2014-4435.
Messenger et al., "Quantifying low energy proton damage in multijunction solar cell", in the proceedings of the 19th Space photovoltaic research and technology conference, 2005, NASA/CP-2007-214494, pp. 8-17.

(56) References Cited

OTHER PUBLICATIONS

Messenger et al., "Status of Implementation of Displacement Damage Dose Method for Space Solar Cell Degradation Analyses", 2008 Dd EOL Calc via SPENVIS manuscript SRM2, Jan. 2008, 8 pgs., Jan. 2008.

Miyazawa et al., "Evaluation of radiation tolerance of perovskite solar cell for use in space", Photovoltaic Specialist Conference (PVSC), 2015 IEEE 42nd, New Orleans, LA, USA, Dec. 17, 2015, pp. 1-4, published Jun. 1, 2015.

Mizuno et al., "A black body absorber from vertically aligned single-walled carbon nanotubes", Proc. Natl. Acad. Sci., Apr. 14, 2009, vol. 106, No. 15, pp. 6044-6047.

Murphey et al., "TRAC Boom Structural Mechanics", American Institute of Aeronautics and Astronautics, Jan. 9-13, 2017, Grapevine, TX, 4th AIAA Spacecraft Structures Conference, doi: 10.2514/6.2017-0171.

Narimanov et al., "Reduced reflection from roughened hyperbolic metamaterial", Optics Express, Jun. 17, 2013, vol. 21, No. 12, pp. 14956-14961.

Narita et al., "Development of high accuracy phase control method for space solar power system", Proc. IEEE International Microwave Workshop Series on Innovative Wireless Power Transmission: Technologies, Systems, and Applications, May 12-13, 2011, pp. 227-230.

NASA TV, "Solar Power, Origami-Style", printed Aug. 14, 2014 from http://www.nasa.gov/jpl/news/origami-style-power-20140814, 4 pgs.

Ni et al., "Metasurface holograms for visible light", Nature Communications, Nov. 15, 2013, vol. 4, pp. 1-6.

Nishioka et al., "Evaluation of temperature characteristics of high-efficiency InGaP/InGaAs/Ge triple-junction solar cells under concentration", Solar Energy Materials and Solar Cells, vol. 85, Issue 3, Jan. 31, 2005, pp. 429-436.

NTPT, "NTPT Thin prepreg 402", Data sheet, Version 1.6, May 11, 2017, 5 pgs.

O'Hara, "Mechanical properties of silicone rubber in a closed volume", Technical Report, Army Armament Research and Development Center, Dec. 1983, 21 pgs.

O'Brien et al., "The AE9/AP9 Radiation Specification Development", Aerospace Corporation, Sep. 15, 2009, Report No. TOR-2009(3905)-8, 29 pgs.

Pellegrino, "AAReST telescope architecture", obtained from http://www.pellegrino.caltech.edu/aarest2/, printed Jul. 5, 2017, 4 pgs.

Penjuri et al., "Simulation and Testing of Deployable CFRP Booms for Large Space Structures", PhD thesis, Aug. 2011, 118 pgs.

Petrovic et al., "Design Methodology for Fault Tolerant ASICs", IEEE 15th International Symposium, Design and Diagnostics of Electronic Circuits & Systems (DDECS), Apr. 18-20, 2012, pp. 8-12.

Pors et al., "Analog Computing Using Reflective Plasmonic Metasurfaces", Nano Lett., Dec. 18, 2014, vol. 15, pp. 791-797.

Preston et al., "From plasmon spectra of metallic to vibron spectra of dielectric nanoparticles", Accounts of Chemical Research, Jan. 9, 2012, vol. 45, No. 9, pp. 1501-1510.

Radford et al., "Measurement of Manufacturing Distortion in Flat Composite Laminates", International Conference on Composite Materials, Jul. 1999, 9 pgs.

Radford et al., "Separating Sources of Manufacturing Distortion in Laminated Composites", Journal of Reinforced Plastics and Composites, first published May 1, 2000, vol. 19, No. 08/2000, pp. 621-641.

Rakic et al., "Algorithm for the determination of intrinsic optical constants of metal films: application to aluminum", Applied Optics, Aug. 1, 1995, vol. 34, No. 22, pp. 4755-4767.

Rakic et al., "Optical Properties of Metallic Films for Vertical-Cavity Optoelectronic Devices", Applied Optics, Aug. 1, 1998, vol. 37, No. 22, pp. 5271-5283.

Raman et al., "Passive radiative cooling below ambient air temperature under direct sunlight", Nature, Nov. 27, 2014, vol. 515, pp. 540-544.

Reha et al., "A Dual-Band Rectangular CPW Folded Slot Antenna for GNSS Applications", International Journal of Advanced Research in Electrical, Electronics and Instrumentation Engineering, Aug. 2014. pp. 11055-11061.

Romeo et al., "Unique space telescope concepts using CFRP composite thin-shelled mirrors and structures", 2007.

\* cited by examiner

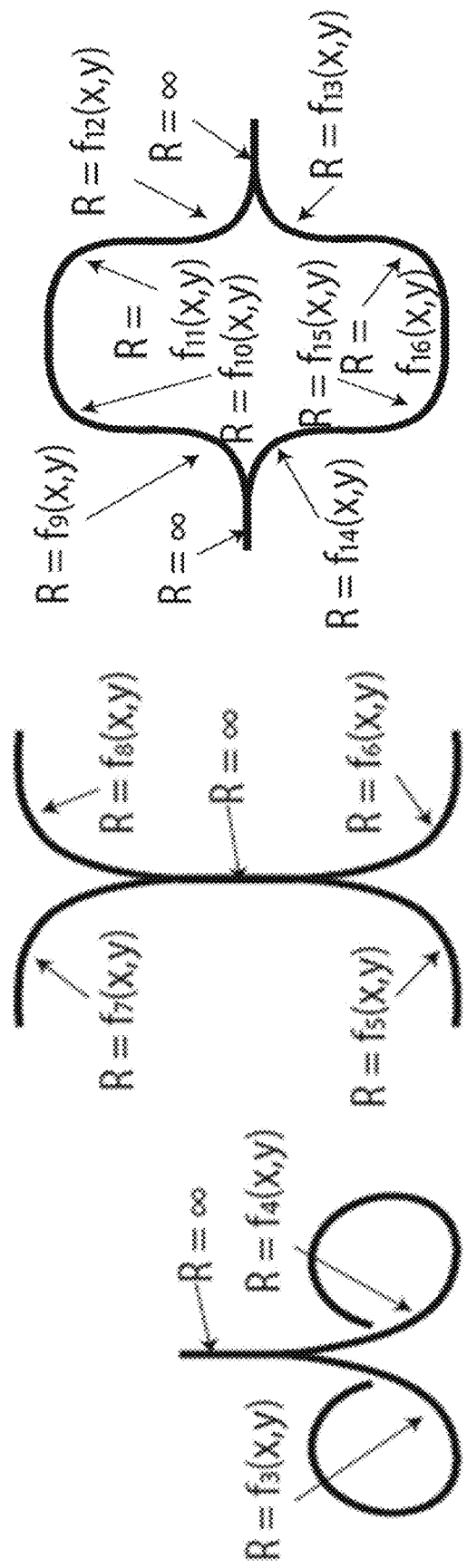

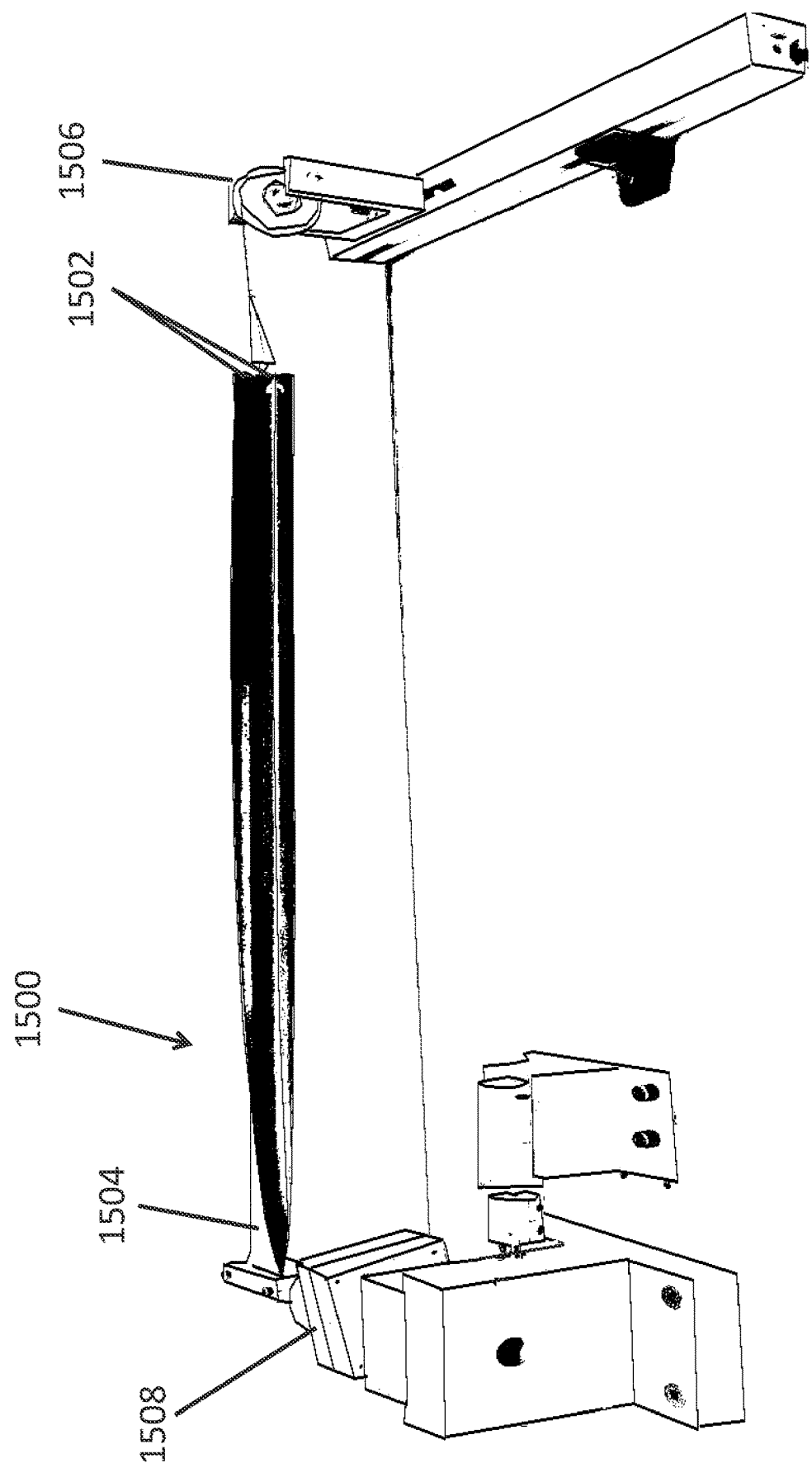

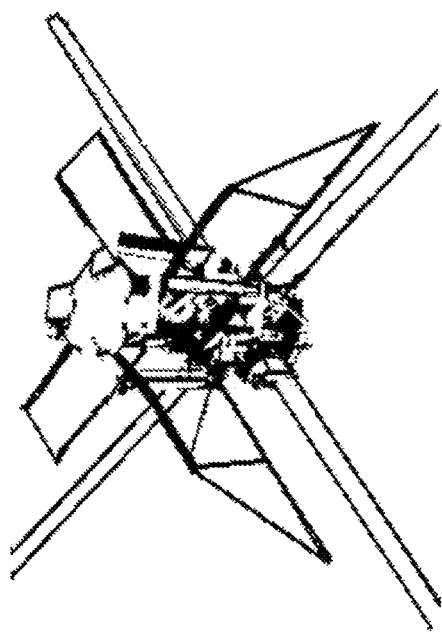
FIG. 21b
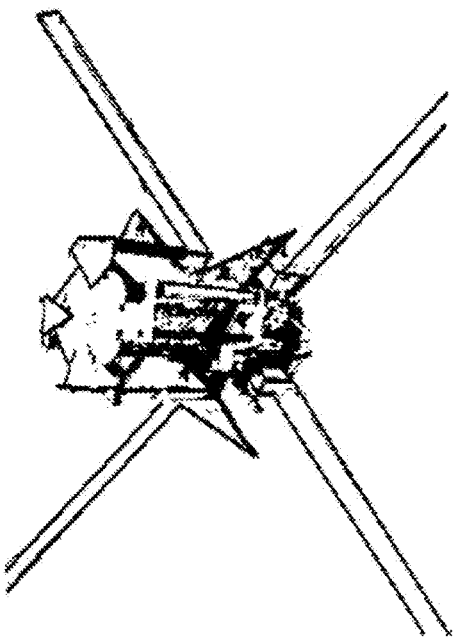
FIG. 21c
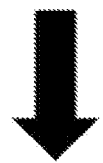
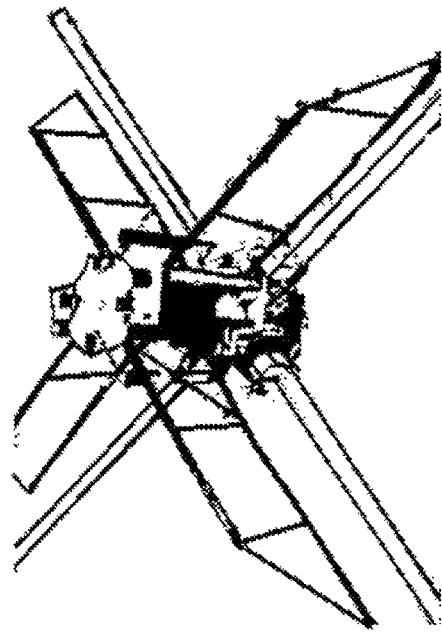
FIG. 21a
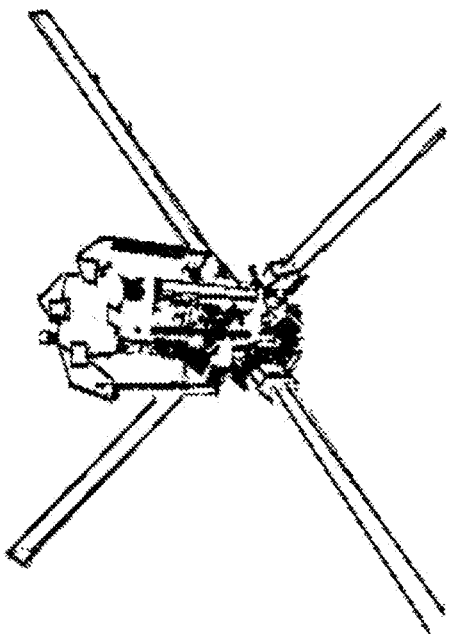
FIG. 21d

COILABLE THIN-WALLED LONGERONS AND COILABLE STRUCTURES IMPLEMENTING LONGERONS AND METHODS FOR THEIR MANUFACTURE AND COILING

REFERENCE TO RELATED APPLICATIONS

This application claims priority to U.S. Provisional Patent Application No. 62/699,184, filed Jul. 17, 2018, the disclosure of which is incorporated herein by reference.

FIELD OF THE INVENTION

The current disclosure is directed generally to coilable thin-walled longerons that can be implemented within space-based coilable structures, and methods for their manufacture and coiling.

BACKGROUND OF THE INVENTION

Space-based solar structures describe physical structures capable of solar energy collection while deployed in a space environment. Such a space environment includes the orbit of extraterrestrial bodies, the surface of extraterrestrial bodies, and non-orbital travel through space. Space-based solar structures are designed to collect solar energy and convert it into electric energy for a variety of uses, including powering the structure itself, and wirelessly transmitting energy to a separate space-based or terrestrial-based structure. Space-based solar structures can include a variety of structures ranging from a single satellite to an array of satellites.

Large arrays of solar structures are necessary in order to produce commercially viable amounts of energy for Earth, as well as sufficient amounts of energy for deep-space and extraterrestrial body exploration. However, these solar structures cost tens of thousands of dollars per kilogram of material to launch into space. Given these factors, the commercial viability of space-based solar structures is dependent upon their volume and weight.

This commercial viability limitation has driven development in space-based systems that are compactable and light weight. However, current space-based support members can only minimize their weight to a certain threshold before their structural integrity becomes compromised.

BRIEF SUMMARY OF THE INVENTION

Many embodiments of the application are generally directed to coilable thin-walled longerons that can be implemented within space-based coilable structures, and methods for their manufacture and coiling.

Various embodiments are directed to a coilable flange longeron comprising:
 a plurality of elongated flange bodies each defining first and second edges extending in parallel longitudinally along the elongated flange bodies; and
 at least one web region formed from at least one conjoined portion of at least two of the plurality of elongated flange bodies;
 wherein each of the plurality of elongated flange bodies exhibits a curvature between the first and second edges;
 wherein each of the plurality of elongated flange bodies has a thickness of ≤200 µm;
 wherein the at least one web region has a thickness of ≤400 µm; and
 wherein the coilable structure has three configurations comprising:
  a deployed configuration, wherein the coilable structure has a thickness greater than the thickness of the web region;
  a flattened configuration, wherein the coilable structure has a thickness less than the thickness of the deployed configuration; and
  a coiled configuration, wherein the flattened configuration is additionally coiled around at least one object, and wherein the length of the at least one object is in a direction transverse to the longitudinal axis of the coilable structure.

In another embodiment, the material of at least one of the plurality of elongated flange bodies is selected from the group consisting of carbon fiber, glass fiber, thermosetting plastics, and combinations thereof.

In a further embodiment, at least one of the plurality of elongated flange bodies comprises a multi-layer composite laminate, and the multi-layer composite laminate comprises at least one unique material layer.

In still another embodiment, each of the plurality of elongated flange bodies comprises a four-layer composite laminate, the innermost and outermost layers comprise 45° ply glass fiber plain weaves, and the middle layers comprise a unidirectional carbon fiber tape.

In a still further embodiment, each of the plurality of elongated flange bodies comprises a three-layer composite laminate, the innermost and outermost layers comprise 45° ply glass fiber plain weaves, and the middle layer comprises a unidirectional carbon fiber tape.

In yet another embodiment, the coilable flange longeron further comprises:
 two elongated flange bodies; and
 one web region formed by the conjoined first edges of each elongated flange body;
 wherein the distance between the two elongated flange bodies increases between the web region and the second edges of each of the two elongated flange bodies.

In a yet further embodiment, the coilable flange longeron further comprises:
 two elongated flange bodies; and
 one web region formed by the conjoined first edges of each elongated flange body;
 wherein each elongated flange body between the web region and the second edge defines a spiral-shaped segment.

In another additional embodiment, the coilable flange longeron further comprises:
 two elongated flange bodies; and
 one web region formed by a conjoined portion of the two elongated flange bodies disposed between the first and second edges of both elongated flange bodies;
 wherein the distance between the two elongated flange bodies increases between both the web region and the first edges of each of the two elongated flange bodies, and the web region and the second edges of each of the two elongated flange bodies.

In a further additional embodiment, the coilable flange longeron further comprises:
 two elongated flange bodies; and
 two web regions, wherein a first web region is formed by a conjoined portion of the first edges of the two elongated flange bodies and a second web region is formed by a conjoined portion of the second edges of the two elongated flange bodies;

wherein the distance between the two elongated flange bodies increases between the two web regions.

In another embodiment again, the at least one web region permanently conjoins at least two of the plurality of elongated flange bodies using a temperature-cured resin.

In a further embodiment again, the temperature-cured resin is selected from the group consisting of Patz PMT-F4 epoxy resin, Patz F6 epoxy resin, Patz F7 epoxy resin, NTPT TP-135, TP 402T, TP 180-380CE, and cyanate ester resins.

In still yet another embodiment, the coiled configuration is coiled around a cylinder with a radius of 0.5 inches to 3 inches.

In a still yet further embodiment, the curvature varies between the first and second edges.

Still other additional embodiments are directed to a process for coiling a structure, the process comprising:
  the flattening of the structure by a pair of flattening cylinders, wherein each flattening cylinder physically contacts the entire structure during the flattening;
  the continuous tensioning of the structure by a force pulling the uncoiled end of the structure away from the coiled end of the structure; and
  the coiling of the structure around a coiling cylinder;
  wherein the flattening cylinders and the coiling cylinder are spatially separated.

In a still further additional embodiment, the process coils a coilable structure comprising:
  a plurality of elongated flange bodies each defining first and second edges extending in parallel longitudinally along the elongated flange bodies; and
  at least one web region formed from at least one conjoined portion of at least two of the plurality of elongated flange bodies;
  wherein each of the plurality of elongated flange bodies exhibits a curvature between the first and second edges;
  wherein each of the plurality of elongated flange bodies has a thickness of ≤200 μm;
  wherein the at least one web region has a thickness of ≤400 μm; and
  wherein the coilable structure has three configurations comprising:
    a deployed configuration, wherein the coilable structure has a thickness greater than the thickness of the web region;
    a flattened configuration, wherein the coilable structure has a thickness less than the thickness of the deployed configuration; and
    a coiled configuration, wherein the flattened configuration is additionally coiled around at least one object, and wherein the length of the at least one object is in a direction transverse to the longitudinal axis of the coilable structure.

In still another embodiment again, the continuous tensioning force pulling the uncoiled end of the structure away from the coiled end of the structure is less than 40 N.

In a still further embodiment again, the coiling cylinder has a radius of 0.5 inches to 3 inches, and the spatial separation between the flattening and coiling cylinders is 15 mm to 100 mm.

In yet another additional embodiment, the curvature varies between the first and second edges.

Yet further additional embodiments are directed to a coilable space structure comprising:
  at least two longerons each comprising a longeron body having at least one supporting surface and a longitudinally supporting structure;
  at least one functional element disposed on the supporting surface of the at least two longerons; and
  wherein the coilable structure has three configurations comprising:
    a deployed configuration, wherein the coilable structure has a thickness greater than the thickness of the web region;
    a flattened configuration, wherein the coilable structure has a thickness less than the thickness of the deployed configuration; and
    a coiled configuration, wherein the flattened configuration is additionally coiled around at least one object, and wherein the length of the at least one object is in a direction transverse to the longitudinal axis of the coilable structure.

In yet another embodiment again, the at least two longerons have at least a top and a bottom supporting surface and having a longitudinal element disposed therebetween, and the structure further comprises at least two functional elements one disposed atop the top supporting surface and a second disposed atop the bottom supporting surface.

In a yet further embodiment again, the at least two elongated longerons are flange longerons, each flange longeron comprising:
  a plurality of elongated flange bodies each defining first and second edges extending in parallel longitudinally along the elongated flange bodies; and
  at least one web region formed from at least one conjoined portion of at least two of the plurality of elongated flange bodies;
  wherein each of the plurality of elongated flange bodies exhibits a curvature between the first and second edges;
  wherein each of the plurality of elongated flange bodies has a thickness of ≤200 μm;
  wherein the at least one web region has a thickness of ≤400 μm;
  wherein the coilable structure has a deployed configuration, wherein the coilable structure has a thickness greater than the thickness of the web region; and
  wherein the at least one functional element is disposed between the at least two flange longerons.

In another additional embodiment again, a plurality of functional elements are each disposed between at least two flange longerons.

In a further additional embodiment again, a plurality of battens are interconnected between and disposed transverse to the at least two flange longerons.

In still yet another additional embodiment, the curvature of the elongated flange bodies varies between the first and second edges thereof.

Still yet further additional embodiments are directed to a compactible space module comprising:
  at least one coilable space structure comprising:
    at least two longerons each comprising a longeron body having at least one supporting surface and a longitudinally supporting structure;
    at least one functional element disposed on the supporting surface of the at least two longerons; and
    wherein the coilable structure has three configurations comprising:
      a deployed configuration, wherein the coilable structure has a thickness greater than the thickness of the web region;
      a flattened configuration, wherein the coilable structure has a thickness less than the thickness of the deployed configuration; and a coiled configuration, wherein the flattened configuration is additionally coiled around at least one object, and wherein the length of the at least one object is in a direction transverse to the longitudinal axis of the coilable structure; and at least one hub from which the longerons and functional elements extend in a deployed configurations and about which the longerons and functional elements coil in a coiled configuration; and wherein the longerons provide the structural support for the compactible space structure.

In yet another additional embodiment again, a plurality of functional elements are each disposed between at least two longerons.

In a yet further additional embodiment again, the at least two elongated longerons are flange longerons, each flange longeron comprising:

a plurality of elongated flange bodies each defining first and second edges extending in parallel longitudinally along the elongated flange bodies; and at least one web region formed from at least one conjoined portion of at least two of the plurality of elongated flange bodies;

wherein each of the plurality of elongated flange bodies exhibits a curvature between the first and second edges;

wherein each of the plurality of elongated flange bodies has a thickness of ≤200 μm;

wherein the at least one web region has a thickness of 400 μm; and wherein the coilable structure has a deployed configuration, and wherein the coilable structure has a thickness greater than the thickness of the web region.

In still yet another embodiment again, a plurality of battens are interconnected between and disposed transverse to at least two longerons.

In a still yet further embodiment again, the curvature of the elongated flange bodies varies between the first and second edges thereof.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 7a-7c provide vertical cross-sectional images of coilable thin-walled longerons with variable curvature in accordance with embodiments of the invention.

FIG. 12c provides an image of a fully coiled configuration when coiling over the arrangement of four cylinders shown in FIG. 12a.

FIG. 15 provides an image of the testing apparatus for a coilable thin-walled longeron coiling process in accordance with an embodiment of the invention.

FIGS. 21a to 21d provide images of a coilable thin-walled longeron array as the array coils upon itself in accordance with an embodiment of the invention.

DETAILED DESCRIPTION OF THE INVENTION

Figure 1:
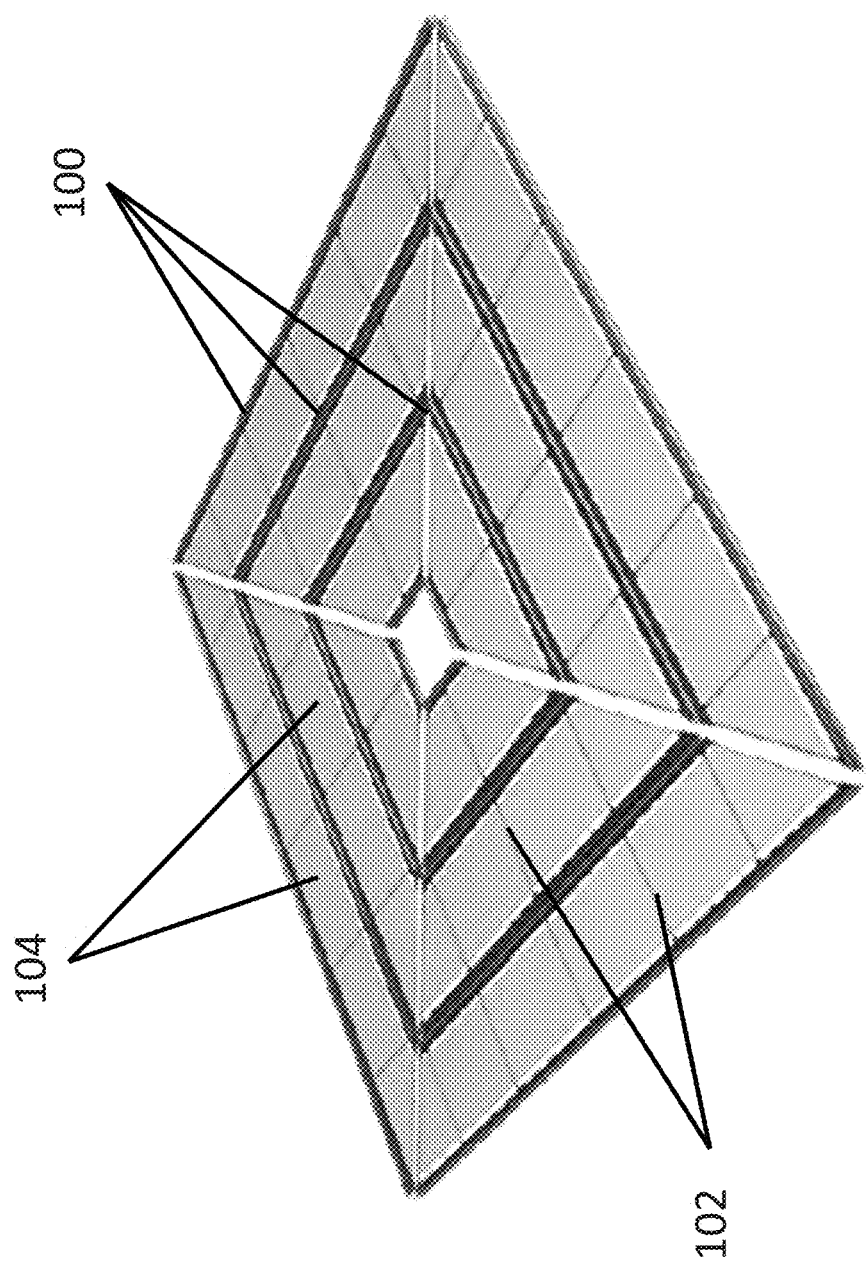
FIG. 1 provides an image of a space-based solar structure, in accordance with an embodiment of the invention.

Turning now to the drawings and data, coilable thin-walled longerons that can be implemented within space-based coilable structures and methods for their manufacture and coiling in accordance with embodiments of the invention are provided.

In some embodiments, the coilable thin-walled longeron is a flange longeron. The flange longeron contains at least two major regions: a web and a plurality of flanges. The web region comprises portions of flanges that are bonded to one another. In various embodiments, the plurality of flanges separate from one another on the same end of the web region. In other embodiments, the plurality of flanges are similar in thickness and shape.

In various embodiments, the longeron can be coiled around a cylinder, or an array of cylinders, to form a compact structure suitable for packaging and transporting. In some such embodiments, the coiling process involves flattening the plurality of flanges with a series of clamps, wrapping the flattened longeron around a rigid cylindrical hub, and applying tension to the longeron in a direction distal to the rigid cylindrical hub. In said embodiments, the coiled longeron can be uncoiled (i.e., deployed) into its pre-coiled shape.

Coilable thin-walled longerons in accordance with many embodiments of the invention may be implemented within space-based coilable structures. In a number of embodiments, space-based coilable structures are comprised of at least one longeron that is capable of rolling and collapsing upon itself. In these embodiments, the longerons may support functional elements of the space-based coilable structure. In several such embodiments, the longerons may support functional elements on more than one surface. A space-based coilable structure according to various embodiments may incorporate an array of longerons connected to each other by non-structural booms and transverse battens. The booms, according to embodiments, provide either no or only limited structural support for the overall structure, but may provide guidance to the longerons and transverse battens during deployment. The longerons and transverse battens, according to embodiments, provide most or all of the structural support for the functional elements of the solar structure. In various embodiments, the functional elements may be comprised of an array of solar panels, an array of antennas, integrated circuits, or a combination thereof. Many embodiments of space-based coilable structures may be packaged by a combination of folding and coiling.

Current state-of-the-art coilable space structures typically employ an architecture that incorporates coilable structural booms. (See U.S. Pat. No. 7,895,795). Booms within space-based coilable structures are typically beam-like structural elements designed to carry bending and column loads that are used to support other functional elements held in tension. For these structural booms, bending stiffness characterizes configurations and increases with increasing structural depth (cross section diameter), material thickness, and material stiffness.

Coilable booms, such as the Storable Tubular Extendable Member (STEM) and the Collapsible Tube Mast (CTM) have been used extensively in spacecraft structures due to their efficient packaging and simple deployment. A more recent design, the Triangular Rollable And Collapsible (TRAC) structure was developed by the Air Force Research Laboratory. (See, e.g., U.S. Pat. No. 7,895,795). It was integrated in multiple spacecraft designs, and on two different solar sail missions. Research has shown that going from thick metallic TRAC booms to ultra-thin composite TRAC booms can significantly reduce the packaged volume, extending the range of applications. However, greatly decreasing the thickness has brought up new issues specific to ultra-thin shells.

For example, it has been shown that tensioning a coilable boom during coiling helps to reduce instabilities and prevent blossoming, both having a negative impact on the packaging efficiency and deployment. This allows the boom to be wrapped around a wide range of hub radii, enabling packaging of long structures, where the coiling radius significantly changes throughout the process. However, it has also been observed that during coiling, the transition region from the fully deployed configuration to the fully coiled configuration displays a high stress concentration, leading to material failure. (See, e.g., Leclerc, C., et al, 4th AIAA Spacecraft Structures Conference, Grapevine, Tx., 2017, p. 0172, the disclosure of which is incorporated herein by reference.).

As a result, booms are typically designed to have a higher thickness and weight than other components of the space structure. For example, current coilable booms may comprise a thickness of approximately 400 µm when flattened. (See U.S. Pat. No. 7,895,795). This thickness inherently limits the packaging efficiency, and therefore, economic feasibility of these structures in space-based applications. Embodiments of the instant disclosure are directed to coilable space structures that replace the traditional structural architecture relying on coilable booms with a structural architecture relying on coilable thin-walled longerons (and transverse battens). This novel architecture bypasses the packaging efficiency and economic feasibility limitations of booms mentioned above.

The traditional definition of a longeron is a longitudinal load-bearing component, commonly used in aerospace applications, such as airframes and wings. A longeron in accordance with many embodiments of the invention employs a modified definition; namely, it is a longitudinal load-bearing component that is used in space-based applications to support functional elements in a coilable structure in place of the structural booms used in traditional designs. Such applications comprise orbiting extraterrestrial bodies, stationing on the surface of extraterrestrial bodies, and traveling through space on a non-orbital path.

Figure 2:
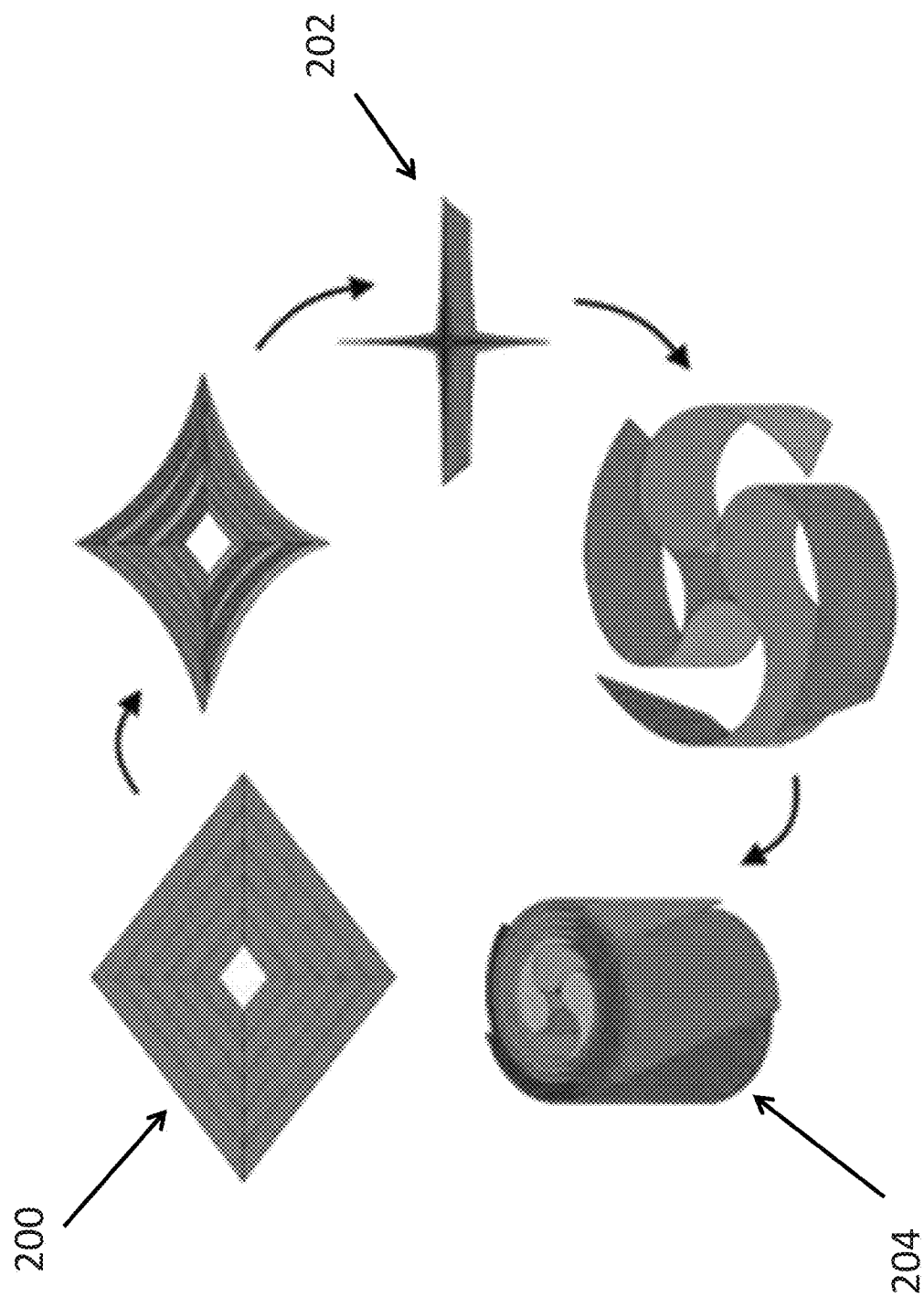
FIG. 2 provides a multi-step representation of the packaging process of a space-based solar structure, in accordance with an embodiment of the invention.

Coilable thin-walled longerons in accordance with many embodiments of the invention may be implemented within space-based coilable structures as shown in exemplary FIGS. 1 and 2. Specifically, in FIG. 1 a space-based coilable structure incorporating an array of longerons is illustrated. The longerons 100 and transverse battens 102 are configured to provide most or all the structural support for the functional elements 104 of the space structure. Booms, if present, are provide only limited structural support and guidance during deployment of the structure. The longerons 100 and transverse battens 102 provide the primary structural support for the functional elements of the solar structure 104. The functional elements 104 may be comprised of an array of solar panels, an array of antennas, integrated circuits, or a combination thereof.

Several space-based coilable structures are known. A multi-step representation of the packaging process of a specific space-based coilable structure is illustrated in FIG. 2. Here, the space-based coilable structure 200 is compressed such that the longerons and transverse battens are flattened. The flattened module is then coiled around an array of cylinders 204. This process will be discussed in greater detail below.

Coilable space structures and coilable longerons in accordance with many embodiments of the invention comprise a thickness that is a fraction of current state-of-the-art space structures when flattened. This results in both reduced volume and weight, which increases packaging efficiency and the economic feasibilty of space-based applications.

Thin-walled coilable longerons are prone to kinking and fracture due to compressive and tensile stress during the coiling and deployment stages. Many embodiments of the instant disclosure are also directed to the process of coiling multi-functional coilable thin-walled longerons, which mitigates these specific failure modes. Mitigating kinks and fractures is particularly important in space-based applications, because damaged structures may be irreparable after they are launched into space.

Coilable Thin-Walled Flange Longeron Structure

Figure 3:
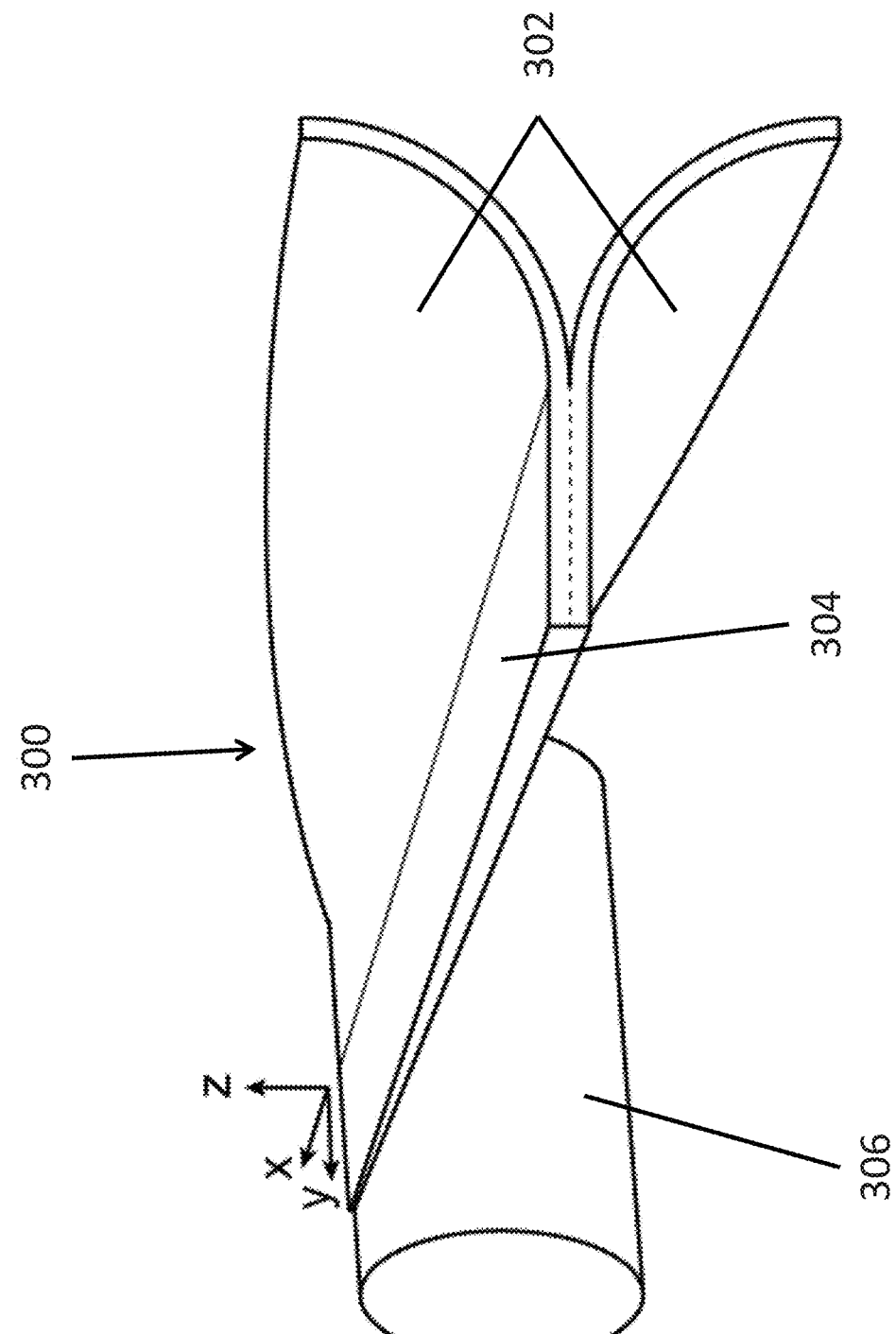
FIG. 3 provides an image of a coilable thin-walled longeron in a semi-coiled configuration in accordance with an embodiment of the invention.

A semi-coiled thin-walled flange longeron in accordance with an embodiment of the invention is illustrated in FIG. 3. The flange longeron generally comprises 300 a flange region 302 and a web region 304. The flange region 302 is comprised of a plurality of thin curved shells. The web region 304 is comprised of flanges that are bonded or otherwise conjoined together. In many embodiments, the flange longeron 300 can be coiled around a rigid cylindrical hub 306. In some such embodiments, it is desirable to minimize the radius of the rigid cylindrical hub 306 to reduce the volume of the coiled structure. In further embodiments, the flange longeron 300 can be coiled around an array of cylinders.

Figure 4:
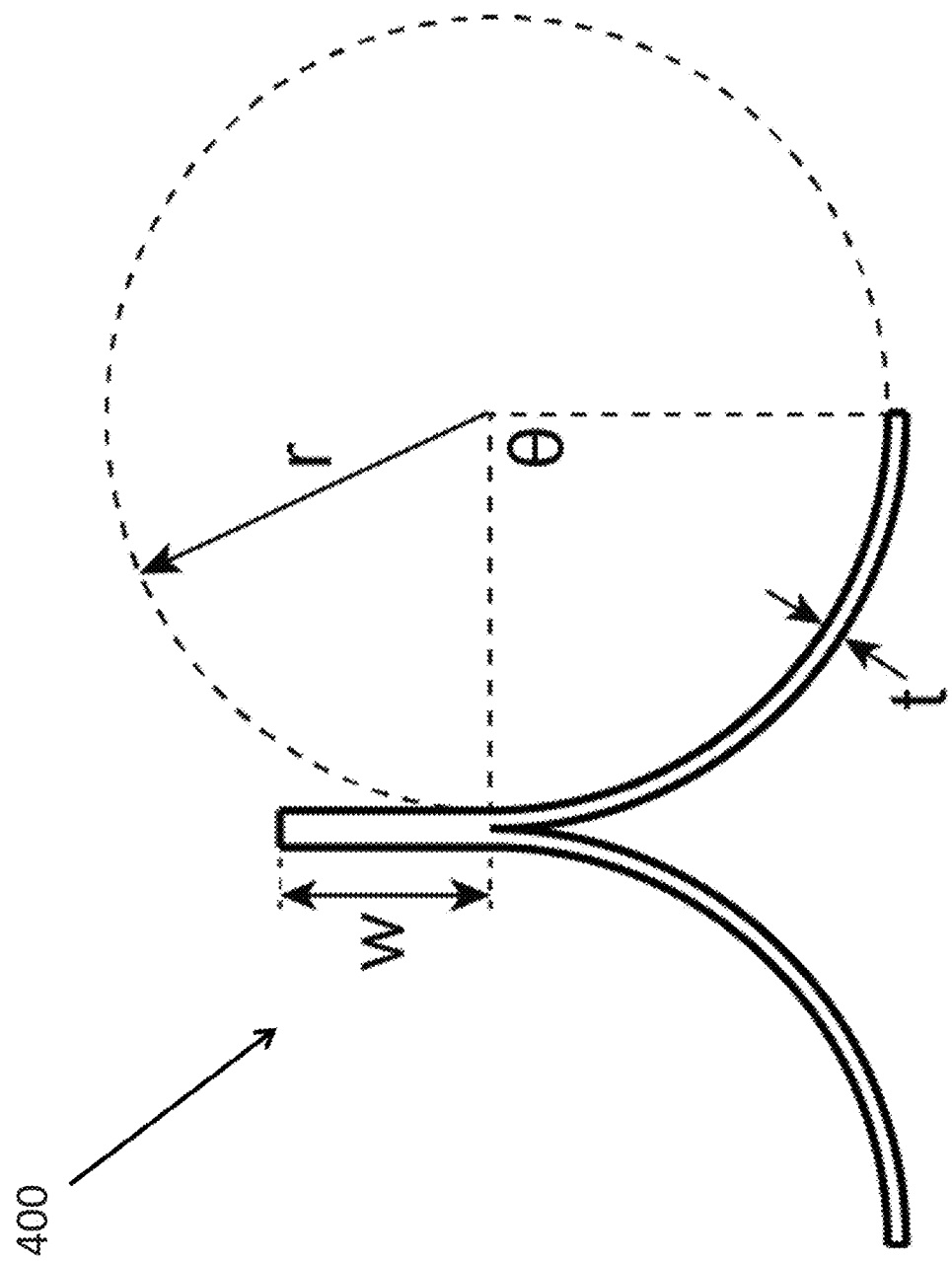
FIG. 4 provides an image of a coilable thin-walled longeron cross section, along with longeron attributes, in accordance with an embodiment of the invention.

A thin-walled flange longeron cross-section in accordance with an embodiment of the invention is illustrated in FIG. 4. The flange longeron 400 is characterized by its web length (w), flange thickness (t), and specific flange attributes. Such attributes influence the shape of the flange, and can include the radius of a theoretical circle created from the flange geometry (r), as well as that circle's angle from the base of the web region to the distal tip of the flange relative to the web region ($\theta$).

Figure 5:
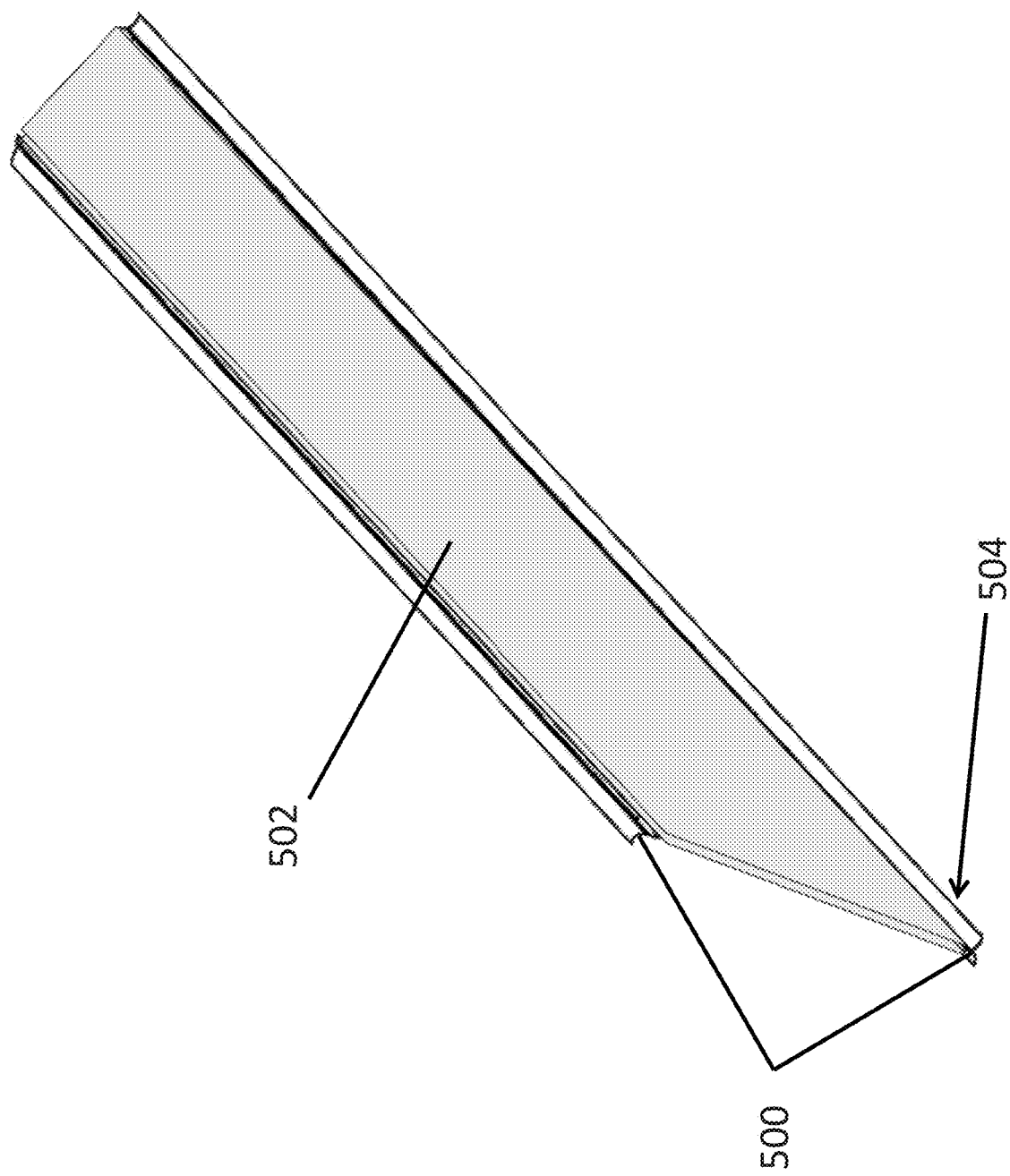
FIG. 5 provides an image of a space-based coilable strip, which incorporates coilable thin-walled longerons in accordance with an embodiment of the invention.

A space-based coilable structure incorporating a set of coilable thin-walled flange longerons in accordance with an embodiment of the invention is illustrated in FIG. 5. The illustrated coilable structure is denoted as a strip. When the strip is uncoiled, the flange longerons 500 are parallel to one another and on opposite ends of the structure. These components directly support functional elements 502 disposed between the flange longerons. Flange curvature is present 504 throughout the length of each flange longeron 500.

Coilable Thin-Walled Longeron Cross-Sections

The cross-section of a coilable thin-walled longeron in accordance with many embodiments of the invention is designed to mitigate kinking and fracture during coiling and deployment by reducing high stress-concentration and increasing structural robustness.

Figure 6A:
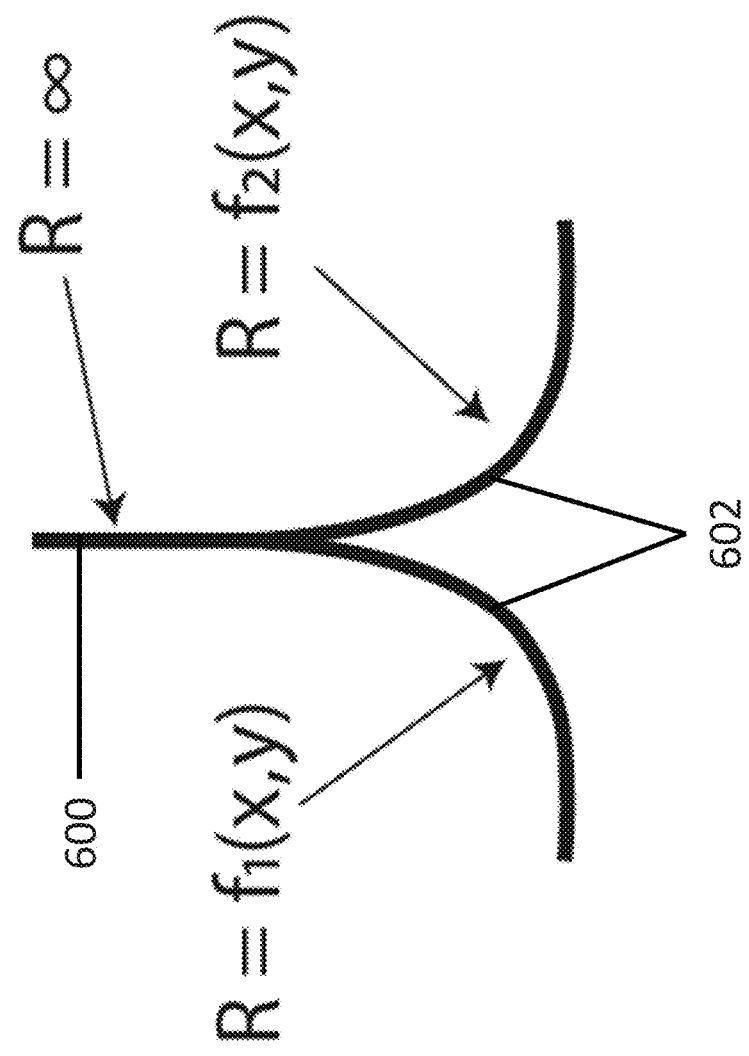
FIG. 6a provides a vertical cross-sectional image of a coilable thin-walled longeron with variable curvature in accordance with an embodiment of the invention.
Figure 6B:
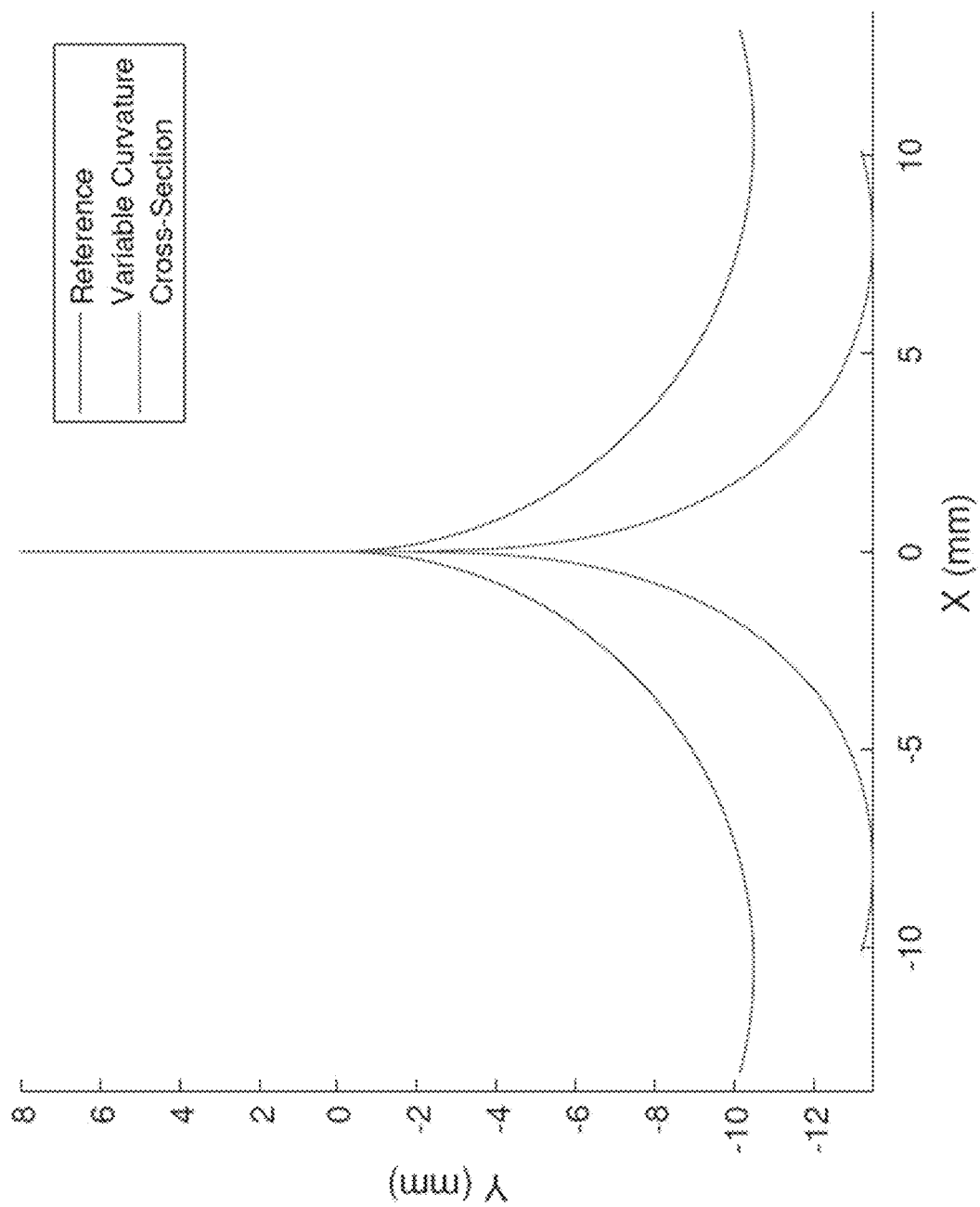
FIG. 6b provides a data graph comparing the cross-section of a coilable longeron with constant curvature in accordance with the prior art to the cross-section of a coilable thin-walled longeron with variable curvature in accordance with an embodiment of the invention.
Figure 6C:
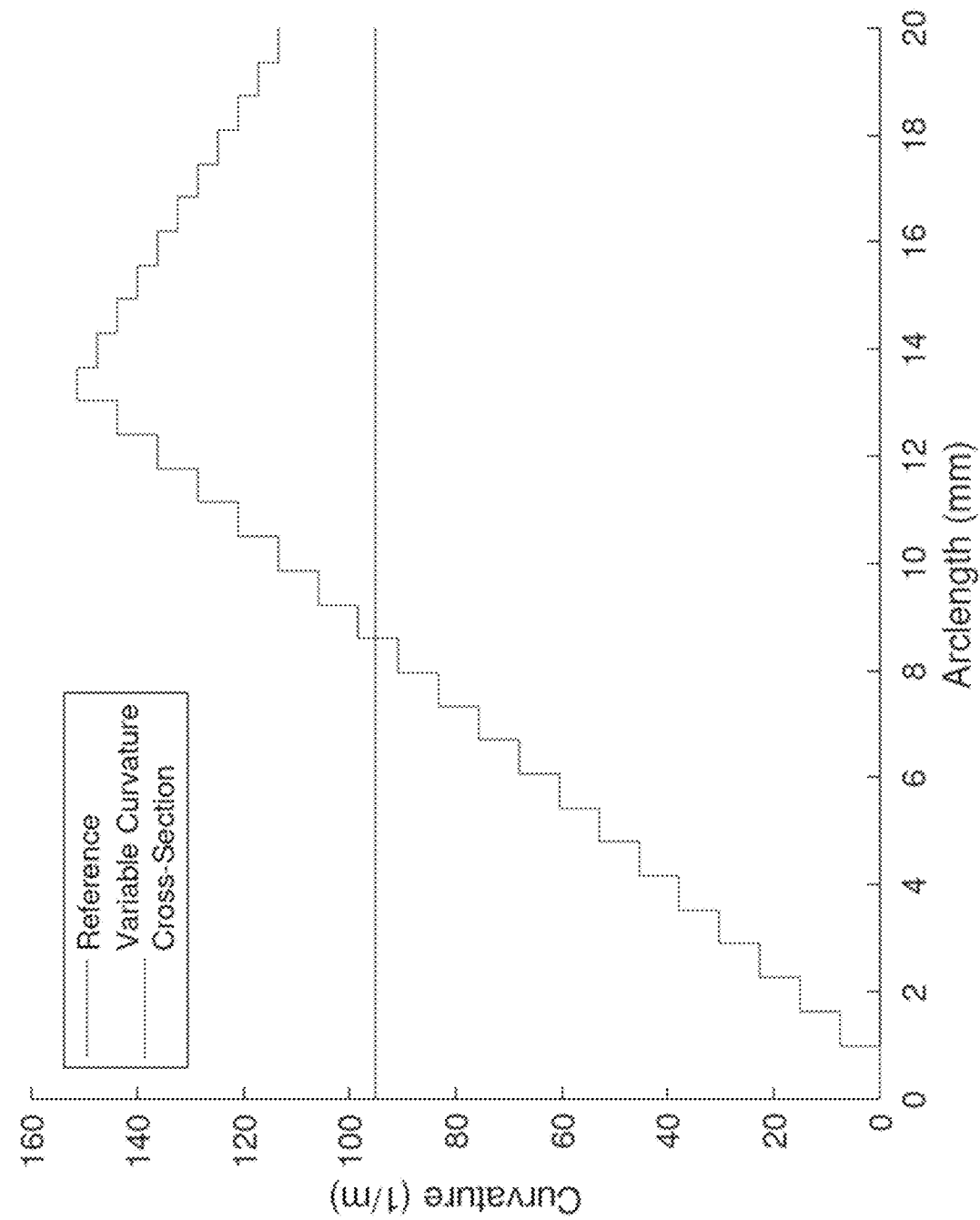
FIG. 6c provides a data graph comparing the curvature of a coilable longeron in accordance with the prior art to the curvature of a coilable thin-walled longeron in accordance with an embodiment of the invention.

The cross-section of a coilable thin-walled flange longeron in accordance with other embodiments of the invention is illustrated in FIG. 6a. Such embodiments are comprised of a web region 600 and a plurality of flanges 602. The plurality of flanges in many embodiments exhibits variable radii of curvature from the proximal end of the flanges to the distal end of the flanges, both relative to the web region. Graphical differences between the geometry and curvature of constant curvature flanges (denoted as "Reference") and variable curvature flanges in accordance with many embodiments of the invention are presented in FIG. 6b and FIG. 6c.

Variable curvature was introduced to eliminate sources of high stress concentration. Curvature discontinuity exists between flanges of constant curvature and the web region, the latter of which exhibits zero curvature. Many embodiments of the invention eliminate this discontinuity by employing a cross-section with a smoothly-varying curvature between the web region and each flange. This design has resulted in lower observed stress concentration when flattening and coiling the thin-walled longerons; the data is presented in the exemplary embodiments section below.

Cross-sections of additional coilable thin-walled longerons with variable curvature in accordance with embodiments of the invention are illustrated in FIG. 7a, FIG. 7b, and FIG. 7c. Similar to the variable curvature flanges discussed above, each of the longerons in FIGS. 7a-7c have a smoothly-varying curvature between the web region and the flanges. The functions $f_1(x, y)$ through $f_{16}(x, y)$ in FIGS. 6a and 7a-c indicate the radii of curvature at various points in the structures' cross-sections. These values are non-constant and reach infinity in the straight section of the structures. It will be understood that the geometry of the flanges may comprise of parabolic, hyperbolic, polynomial, splines, and any further shape that eliminates curvature discontinuity between the flanges and the web region.

Figure 8:
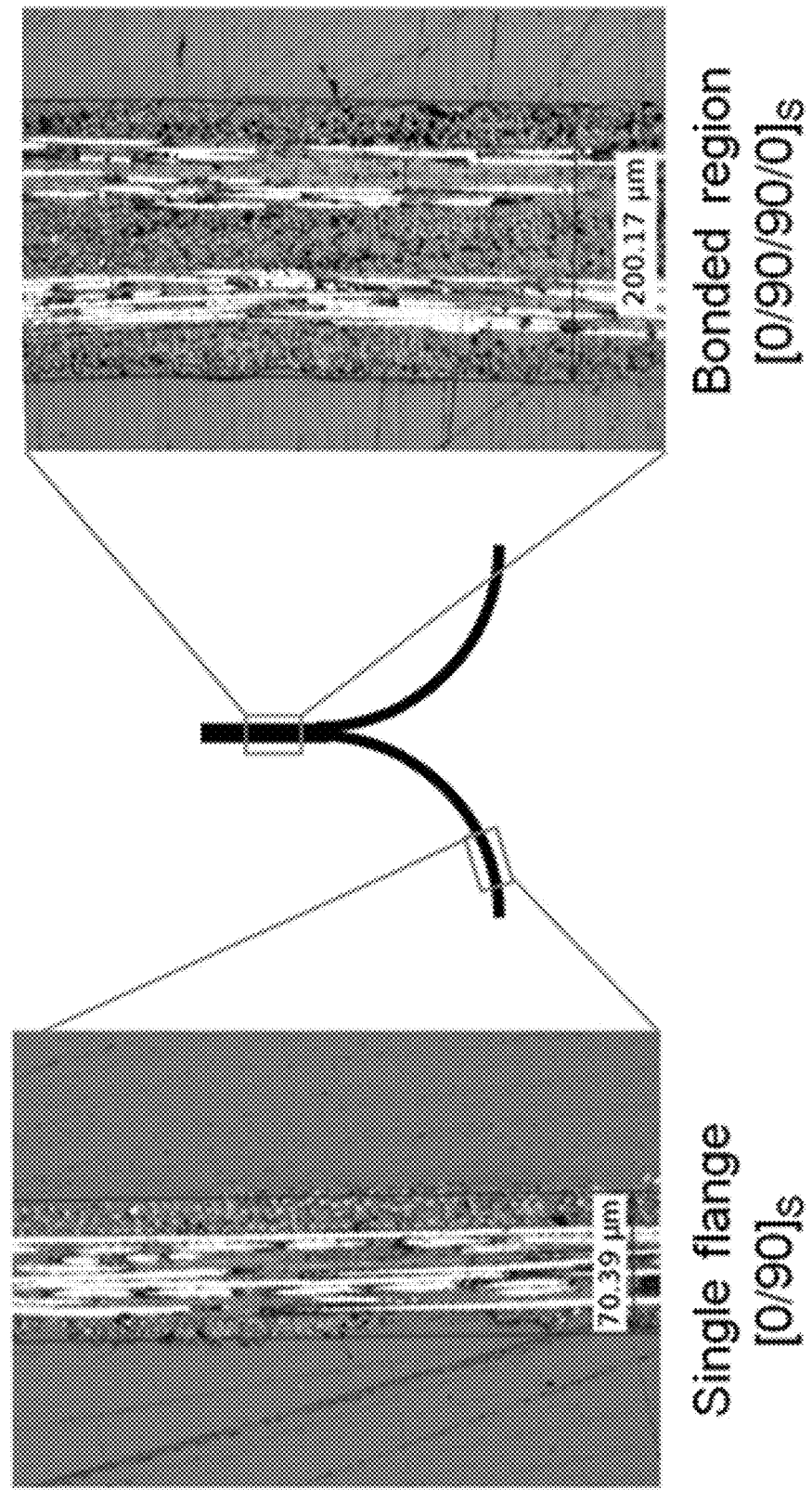
FIG. 8 provides micrograph images of a coilable thin-walled longeron and characterizes its thickness in accordance with an embodiment of the invention.

The thickness of a coilable thin-walled longeron in accordance with many embodiments of the invention is designed to minimize the volume of the space-based coilable structure and optimize its packaging efficiency. Micrograph images of a coilable thin-walled flange longeron in accordance with an embodiment of the invention are presented in FIG. 8. In many embodiments, single flanges exhibit a thickness on the order of 50 µm and the bonded web region exhibits a thickness on the order of 100 µm. Although this specific longeron thickness scheme is put forth, any of a variety of thicknesses can be utilized in accordance with embodiments of the invention.

Coilable Longeron Materials

The materials of a coilable thin-walled longeron in accordance with many embodiments of the invention are selected to exhibit a combination of flexibility, high stiffness, and high toughness. Such materials are capable of withstanding stress concentrations during flattening and coiling without kinking or fracturing.

Figure 9:
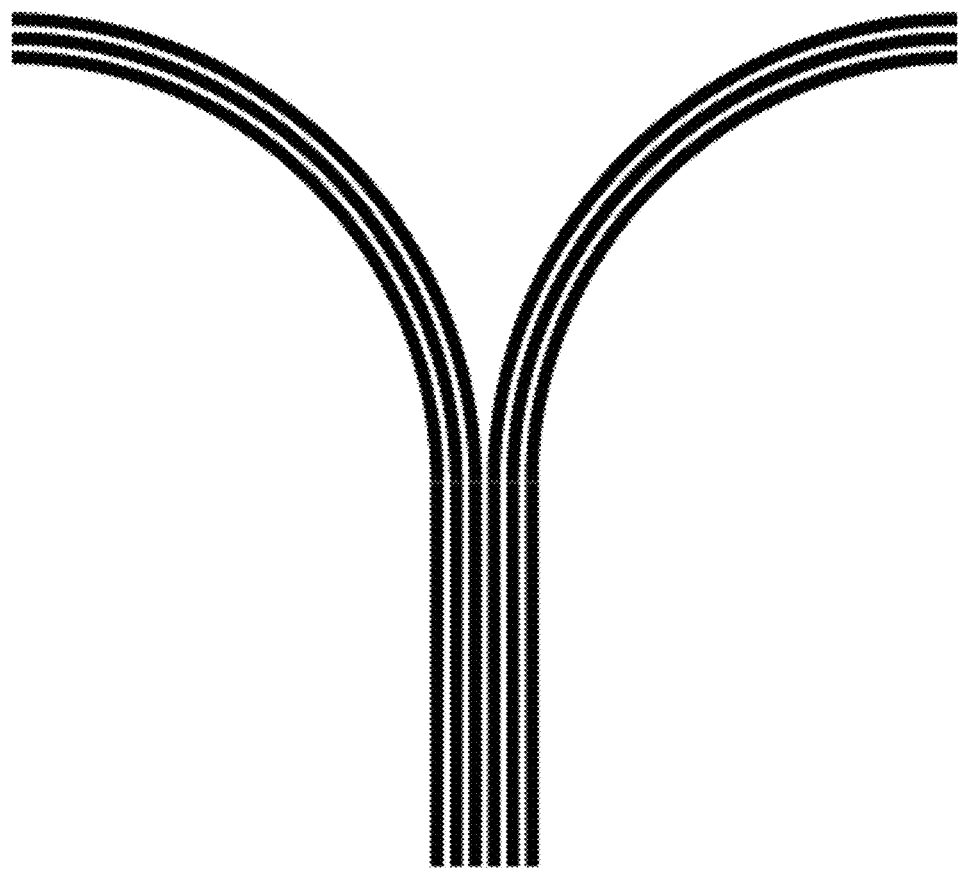
FIG. 9 provides a vertical cross-sectional image of a coilable thin-walled longeron with distinct material layers in accordance with an embodiment of the invention.

In various embodiments, the longeron is comprised of carbon fiber, glass fiber, thermosetting plastics (e.g., epoxy resins), or a combination thereof. In some embodiments, the longeron is comprised of a plurality of layers. These layers may provide added toughness and higher strain limits. A coilable thin-walled longeron with distinct material layers in accordance with an embodiment of the invention is illustrated in FIG. 9.

In one such embodiment, each flange is a 3-layer composite laminate. The innermost and outermost layers are 45° ply glass fiber plain weaves made with JPS E-glass fabric, and the middle layer is unidirectional carbon fiber tape with NTPT ThinPreg 402 epoxy resin. In another 3-layer embodiment, the innermost and outermost 45° ply glass fiber plain weave layers are impregnated with NTPT ThinPreg 402 epoxy resin. In these embodiments, the glass fiber plain weave layers provide in-plane shear and transverse strength to the laminate, and the carbon fiber layer drives the mechanical properties of the deployed (i.e., uncoiled) structure. Although these specific laminates are put forth, any of a variety of laminates can be utilized in accordance with embodiments of the invention.

In another such embodiment, each flange is a 4-layer composite laminate. The innermost and outermost layers are 45° ply glass fiber plain weaves made with JPS E-glass fabric and Patz PMT-F4 epoxy resin, and the middle layers are unidirectional carbon fiber tape made of Torayca T800 carbon fibers with NTPT ThinPreg 402 epoxy resin. In another 4-layer embodiment, the middle layers are unidirectional carbon fiber tape made of MR70 carbon fibers with NTPT ThinPreg 402 epoxy resin. In these embodiments, the glass fiber plain weave layers provide in-plane shear and transverse strength to the laminate, and the carbon fiber layers drive the mechanical properties of the deployed (i.e., uncoiled) structure. Although these specific laminates are put forth, any of a variety of laminates can be utilized in accordance with embodiments of the invention.

In various embodiments, the web region is comprised of individual flanges bonded together with a temperature-cured resin. In many embodiments, the bonding layer comprises Patz PMT-F4 epoxy resin, Patz F6 epoxy resin, Patz F7 epoxy resin, NTPT TP-135, TP 402T, TP 180-380CE, cyanate ester resins, or a combination thereof. In other embodiments, the bonding layer comprises a composite material. Although these specific resins are put forth, any of a variety of resins can be utilized in accordance with embodiments of the invention.

Coilable Longeron Manufacturing Process

The manufacturing process of coilable thin-walled longerons in accordance with many embodiments of the invention includes thinning, shaping, and bonding steps. Each step is discussed in detail below.

As stated above, single flanges may exhibit a thickness on the order of 50 μm and the bonded web region may exhibit a thickness on the order of 100 μm. To attain this thin-walled attribute, thin-ply unidirectional carbon fiber and glass fiber plain weaves are layered either by a manual or automated process. In some such embodiments, the carbon fiber and glass fiber plain weave layers are impregnated with epoxy resin. Once the layering is complete, the flanges are temperature-cured in an autoclave.

As stated above, single flanges may exhibit parabolic, hyperbolic, polynomial, spline, and any further shape that eliminates curvature discontinuity between the flanges and the web region. To attain this shape, the laminates constituting the flanges are laid upon a mold with the desired shape. The mold may comprise aluminum, silicone, or composite materials. During the forming process, a vacuum bag ensures that the flanges conform to the mold shape.

As stated above, the web region is comprised of individual flanges bonded together with a temperature-cured resin. In some embodiments of the invention, the surfaces of each flange are plasma etched prior to bonding. In other embodiments of the invention, individual flanges are placed within a mold and a resin is applied to form the web region. Once the web region is formed, the longeron manufacturing process is complete.

Coilable Longeron Packaging and Deploying Process

In order for coilable thin-walled longerons in accordance with many embodiments of the invention to go from the fully deployed configuration to the fully coiled packaged configuration, the longerons need to undergo two shape changes: flattening and coiling. The packaging process of such embodiments is designed to reduce high-stress concentration on the longerons during these shape changes.

Figure 10:
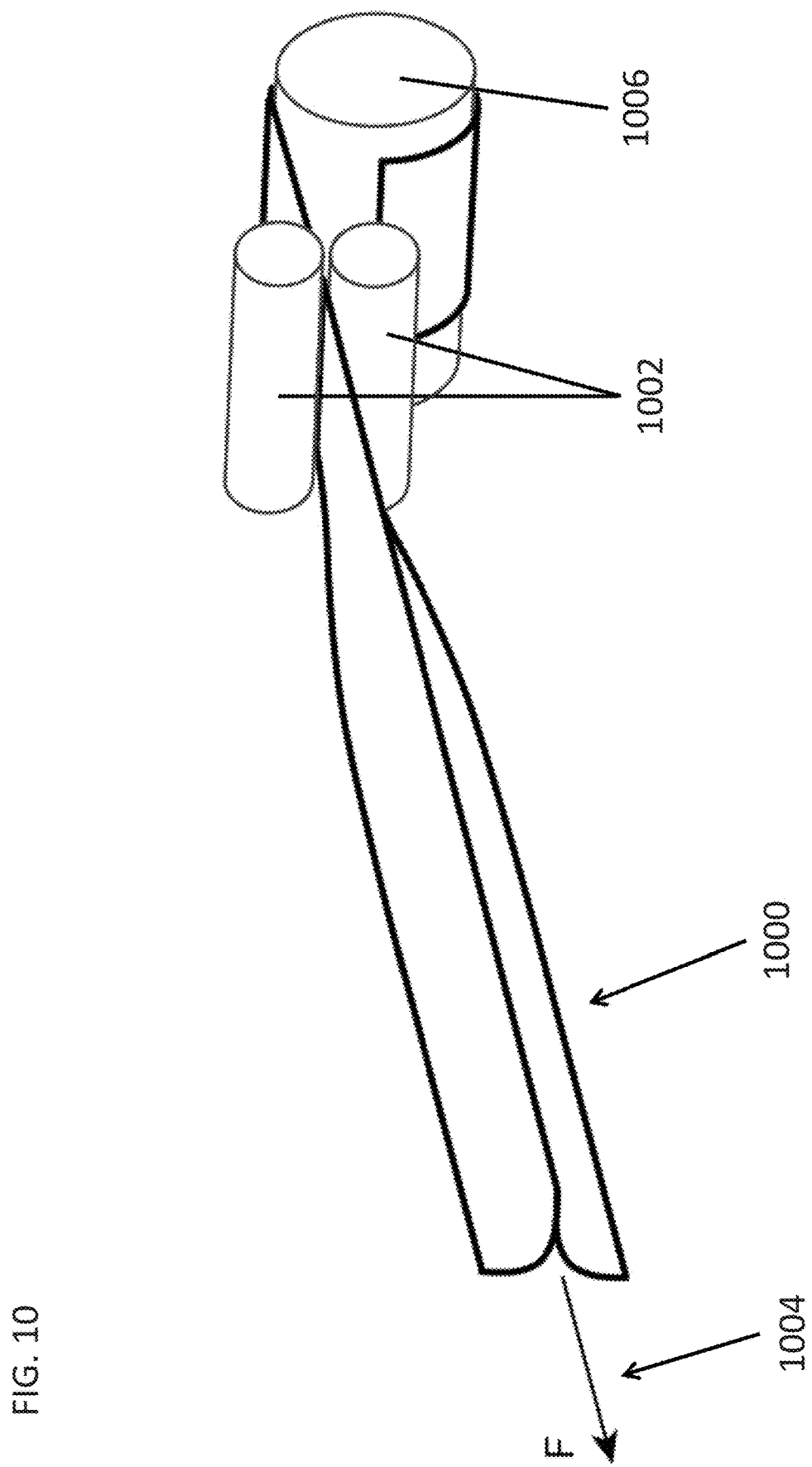
FIG. 10 provides an image of a modified coiling process for coilable thin-walled longerons in accordance with an embodiment of the invention.

The packaging process of a coilable thin-walled flange longeron in accordance with many embodiments of the invention is illustrated in FIG. 10. In such embodiments, the flange longeron 1000 is flattened between a set of nip rollers 1002, held under a force (F), such as, for example, tension, pulling the uncoiled end of the flange longeron away from the coiled end 1004, and coiled around a cylindrical hub 1006. In further embodiments, the flange longeron has a coiling radius of 0.5 inches. In further embodiments, the flattening step occurs prior to the coiling step, creating a transition region in between flattening and coiling. This decouples the two deformation steps, which reduces high-stress concentrations on the longeron. The degree to which stress concentrations may be reduced is disclosed in greater detail in forthcoming exemplary embodiments.

Figure 11:
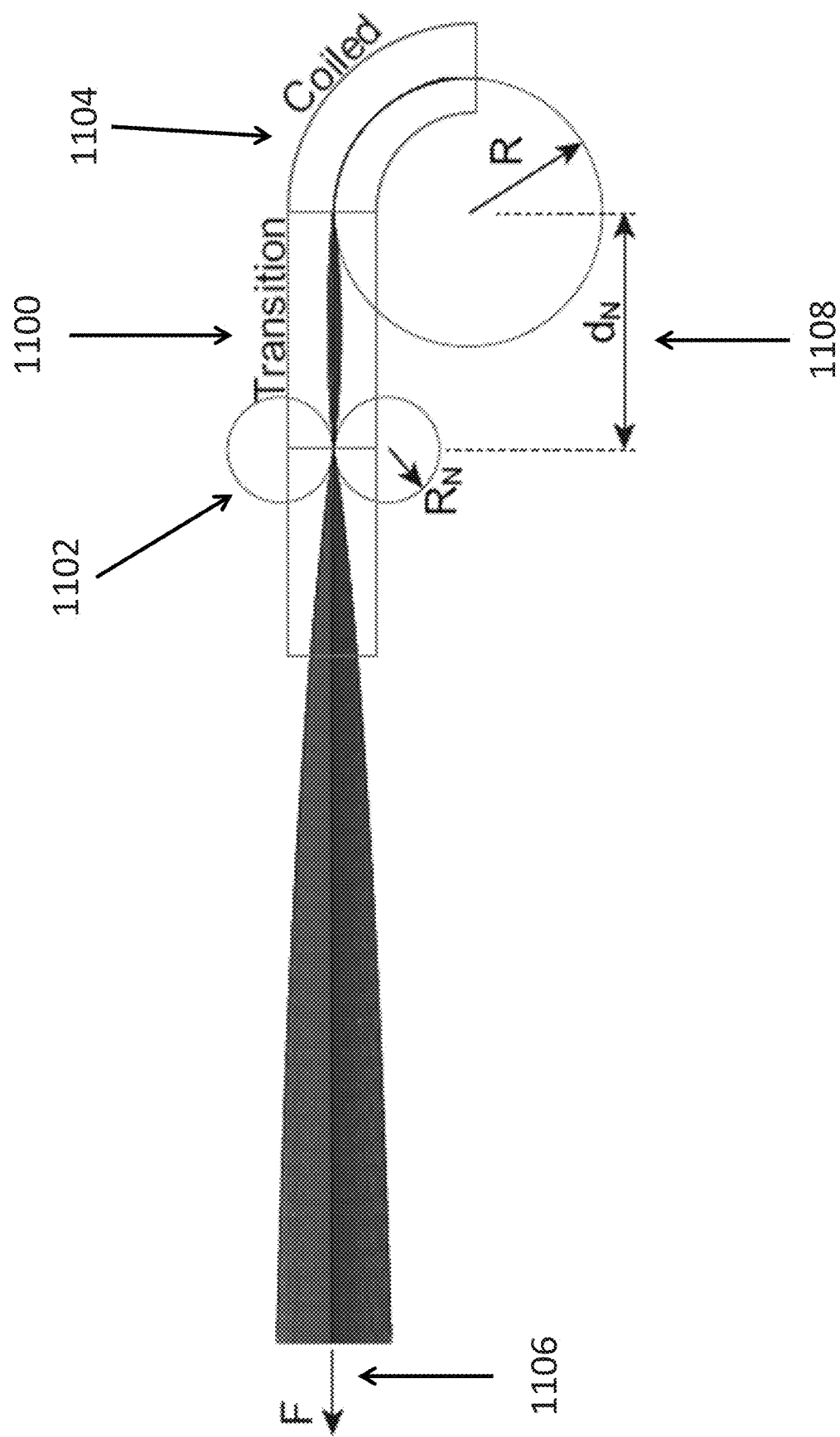
FIG. 11 provides a multi-step representation of a modified coiling process for coilable thin-walled longerons in accordance with an embodiment of the invention.

The decoupled flattening and coiling steps within the packaging process of a coilable thin-walled flange longeron in accordance with many embodiments of the invention is illustrated in FIG. 11. As stated above, the transition region 1100 is between the flattening region 1102 and coiling region 1104. The flange longeron is also under an applied force (F) 1106 such as continuous tension. In some such embodiments, the transition region length (dN) 1108 is within the range of 15 mm to 100 mm. Although this specific transition region length is put forth, any of a variety of transition region lengths can be utilized in accordance with embodiments of the invention.

Figure 12A:
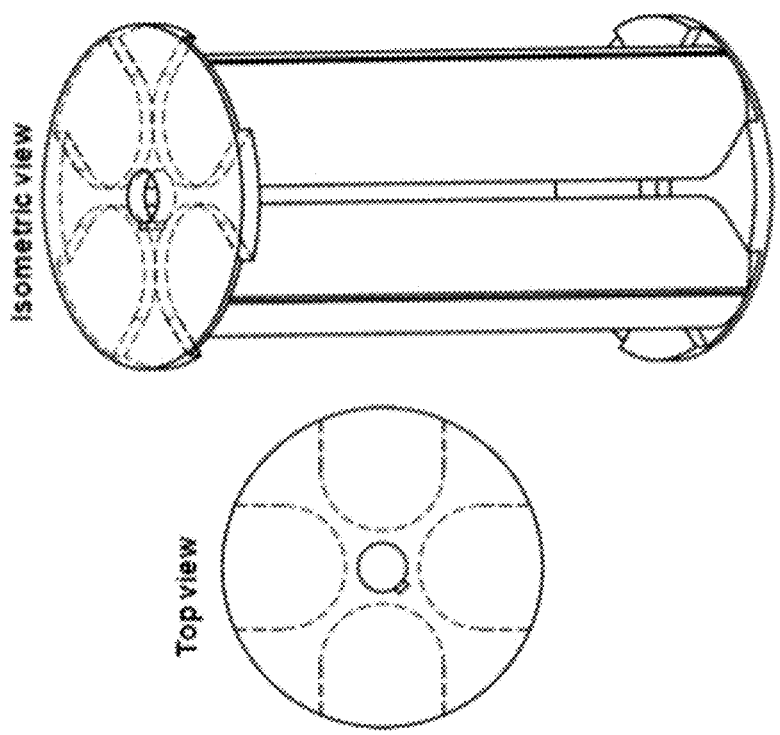
FIG. 12a provides one arrangement of four cylinders, each of which begin the coiling process for a set of longerons or strips.
Figure 12B:
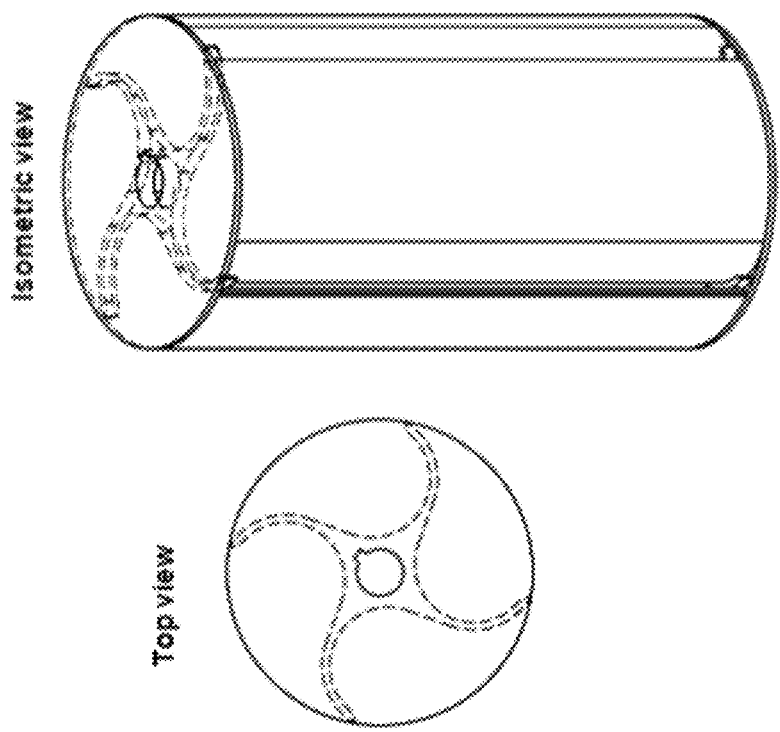
FIG. 12b provides another arrangement of four modified cylinders, each of which begin the coiling process for a set of longerons or strips.
Figure 12D:
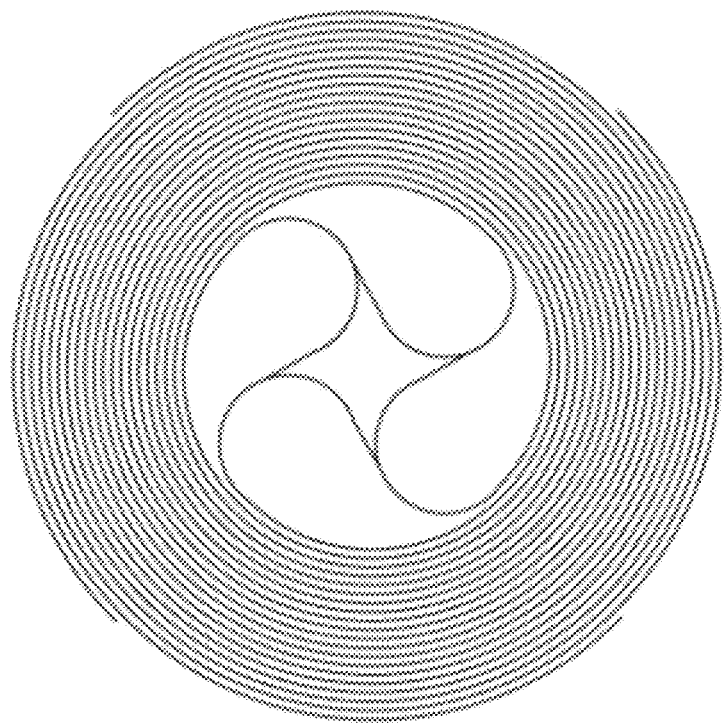
FIG. 12d provides an image of a fully coiled configuration when coiling over the arrangement of four modified cylinders shown in FIG. 12b.
Figure 12C:
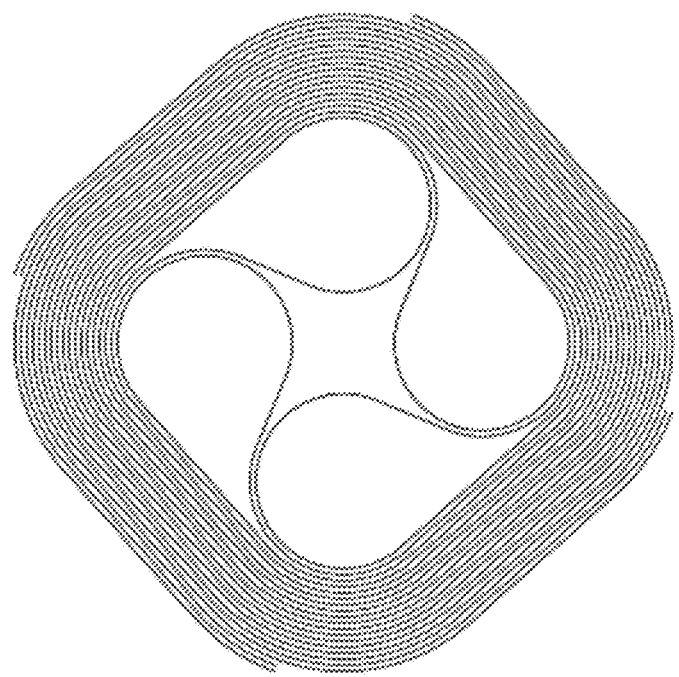

In many embodiments of the invention, a coilable thin-walled longeron may be coiled around an array of cylinders. In these configurations, multiple longerons and multiple strips may be incorporated into one coiled structure. Examples of coiling around an array of cylinders in accordance with many embodiments of the invention is illustrated in FIG. 12a to FIG. 12d. FIG. 12a depicts a set of four modified cylinders, each of which begin the coiling process for a set of longerons or strips. FIG. 12b similarly depicts another set of four modified cylinders, each of which begin the coiling process for a set of longerons or strips. However, as shown in FIGS. 12c and 12d, the embodiment depicted in FIG. 12b employs cylinders with an optimized geometry, such that the fully-coiled shape is that of a circle. Although these specific coiling arrays are put forth, any of a variety of coiling arrays can be utilized in accordance with embodiments of the invention.

In order for the coilable thin-walled longeron in accordance with many embodiments of the invention to go from the fully coiled packaged configuration to the fully deployed configuration, the flanges need to undergo two shape changes: uncoiling and unflattening. The deployment process of such embodiments is designed to reduce high-stress concentration on the flanges during these shape changes. In some embodiments of the invention, the uncoiling and unflattening steps are decoupled to reduce stress on the longeron, similar to the packaging process.

Coilable Space Structures Implementing Longerons

Coilable thin-walled longerons in accordance with many embodiments of the invention may be implemented into coilable space structures. One such coilable space structure is illustrated in FIG. 1. As previously discussed, the longerons 100 are structurally connected to by a plurality of transverse battens 102. Any booms, if present, are provided primarily to guide the deployment of the other elements of the structure; namely, the longerons 100 and transverse battens 102. The longerons 100 and transverse battens 102 provide primary structural support for the functional elements of the solar structure 104. The functional elements 104 may be comprised of an array of solar panels, an array of antennas, integrated circuits, or a combination thereof.

Figure 13:
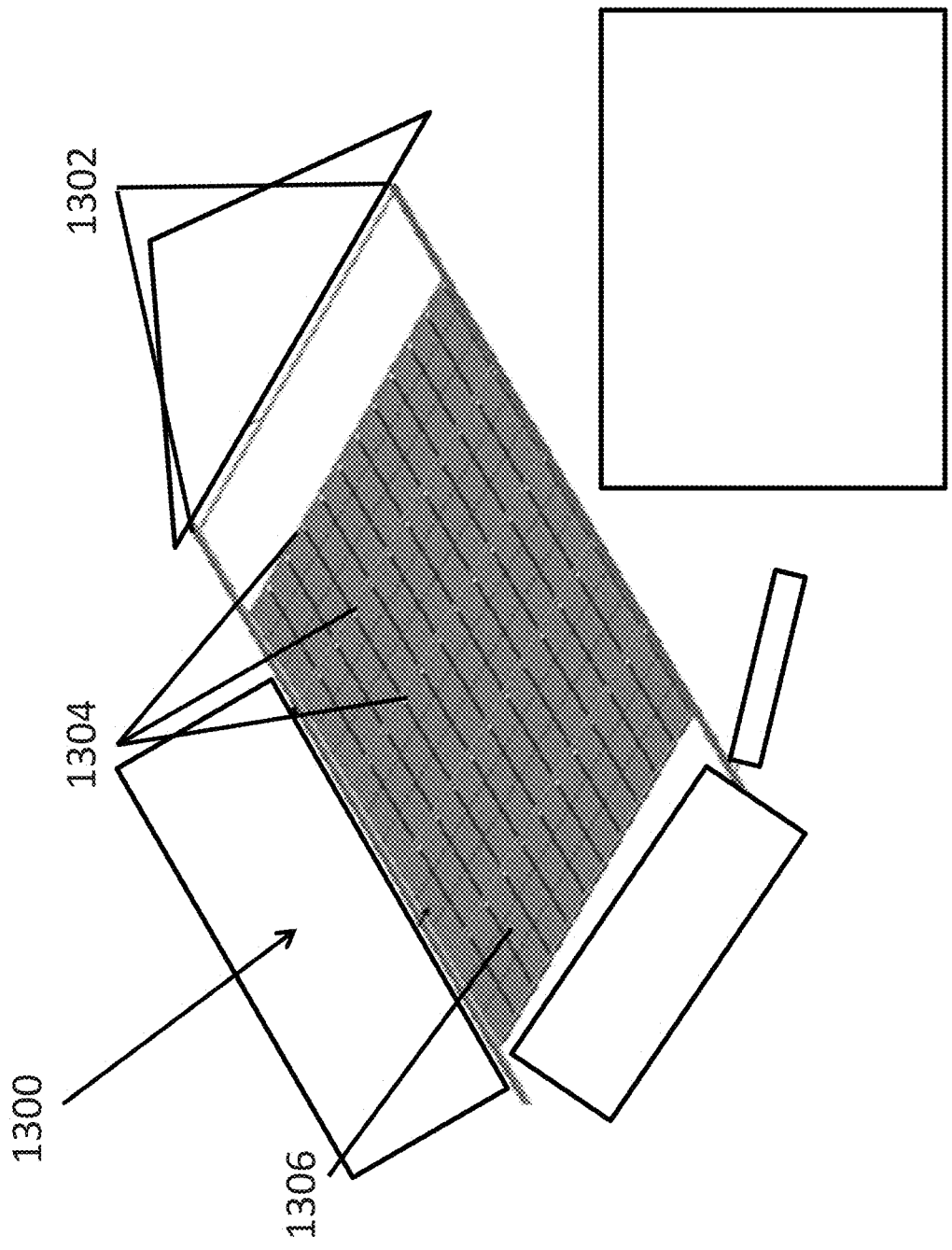
FIG. 13 provides an image of a coilable strip incorporating coilable thin-walled longerons in accordance with an embodiment of the invention.

The coilable space structure illustrated in FIG. 1 is comprised of an array of coilable strips. A representative coilable strip in accordance with many embodiments of the invention is illustrated in FIG. 13. The strip 1300 has a ladder-like architecture in which two parallel sides comprise coilable thin-walled longerons 1302 connected by transverse battens 1304, the combination of which provide the primary structural support for the structure. In some embodiments of the invention, the transverse battens are rectangular cross-section carbon fiber rods. Strips are capable of supporting a plurality of functional elements 1306.

In one embodiment of the invention, the fully deployed space structure measures up to 60 m×60 m in size and is composed of ladder-type coilable strips of equal width. Each strip comprises two coilable thin-walled longerons in accordance with embodiments of the invention and supports many functional elements. Although this specific coilable space structure is put forth, any of a variety of coilable space structures can be utilized in accordance with embodiments of the invention.

Coilable strips incorporating coilable thin-walled longerons in accordance with many embodiments of the invention must be precisely constructed to mitigate substantial buckling of the strips. In one such embodiment, the coilable strip is constructed of two coilable thin-walled flange longerons and three transverse battens. The transverse battens are 3.0 mm wide and 0.6 mm thick rectangular carbon fiber rods, connected transversely to the coilable thin-walled longerons every 200 mm. A glass fiber bonding element connects the coilable thin-walled longerons and transverse battens.

Studies have been conducted to determine when and where buckling occurs in coilable strips when subjected to a buckling pressure. In these studies, buckling pressure is applied either to the coilable thin-walled flange longerons on one end of the coilable strip, or to the transverse batten on one end of the strip. When the coilable strips incorporate coilable flange longerons under 2.0 m in length and the coilable longerons are separated by less than 0.6 m, a localized buckle appears on one flange of the flange longeron. When the coilable strips incorporate coilable flange longerons under 2.0 m in length and the coilable longerons are separated by more than 0.6 m, the batten nearest to the applied pressure buckles.

Figure 14:
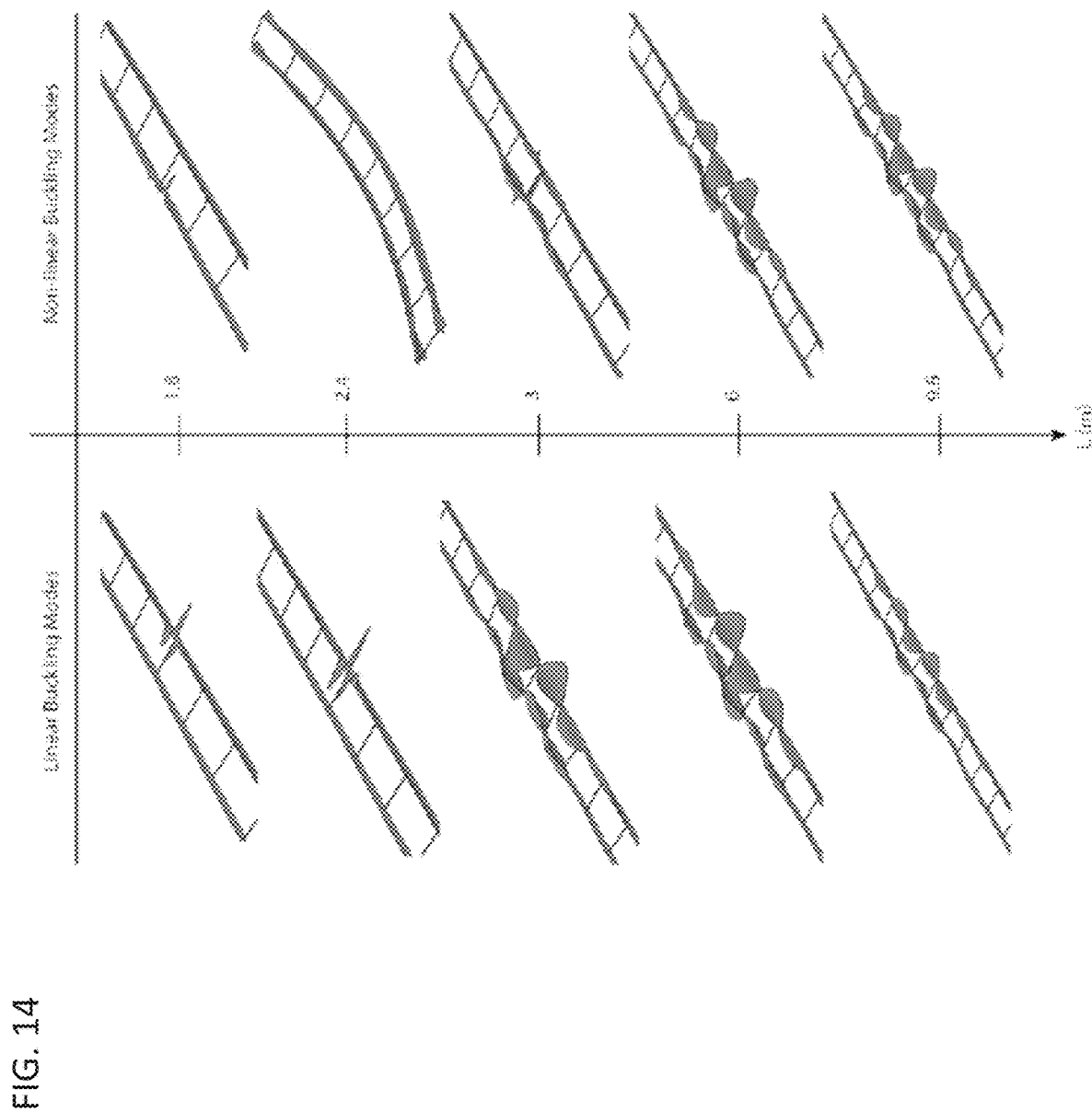
FIG. 14 provides a graphical representation of buckling simulations for several coilable strip lengths.

When the coilable strips incorporate coilable flange longerons over 2.0 m in length, the buckling mode is not localized within one region of the strip. The flange longerons exhibit both torsional buckling and flange buckling, and the wavelength of the buckling shape corresponds with the transverse batten spacing. A graphical representation of buckling simulations for several coilable strip lengths is illustrated in FIG. 14.

EXEMPLARY EMBODIMENTS

The following discussion sets forth embodiments where coilable thin-walled longerons may find particular application. It will be understood that these embodiments are provided only for exemplary purposes and are not meant to be limiting.

Example 1: Coilable Thin-Walled Longeron Packaging Process Testing Apparatus

A coilable longeron packaging process testing apparatus in accordance with embodiments of the invention is illustrated in FIG. 15. The testing apparatus 1500 contains components of the many coilable thin-walled longeron embodiments previously discussed; namely, a plurality of flanges 1502 and a web region 1504. The testing apparatus 1500 also contains components of the many packaging process embodiments previously discussed; namely, a tensioning mechanism 1506, and a rigid hub 1508 to coil the longeron. Coiling tests were performed by applying a constant tension of 15 N 1506 to the longeron and coiling the longeron by rotating the rigid hub 1508.

Example 2: Studies of Coilable Thin-Walled Longerons Made of Isotropic Materials Coilable thin-walled longerons made of theoretical isotropic materials were put through coiling simulations in various configurations to determine the maximum stresses on the longeron. The material properties for the isotropic longeron were chosen to match the bending stiffness of the orthotropic laminate selected for the following exemplary embodiment. Specifically, the isotropic flange thickness was obtained using the equation:

$$\left(\frac{Et^3}{12(1-v^2)}\right)_{iso} = (D_{11})_{ortho}$$

where the left-hand side is the plate flexural rigidity of the isotropic material, and $D_{11}$ is the first element of the composite material bending matrix obtained using the Classical Laminate Theory. Assuming E=69 GPa and v=0.33, the isotropic material flange thickness t was calculated to be 60 μm.

Figure 16A:
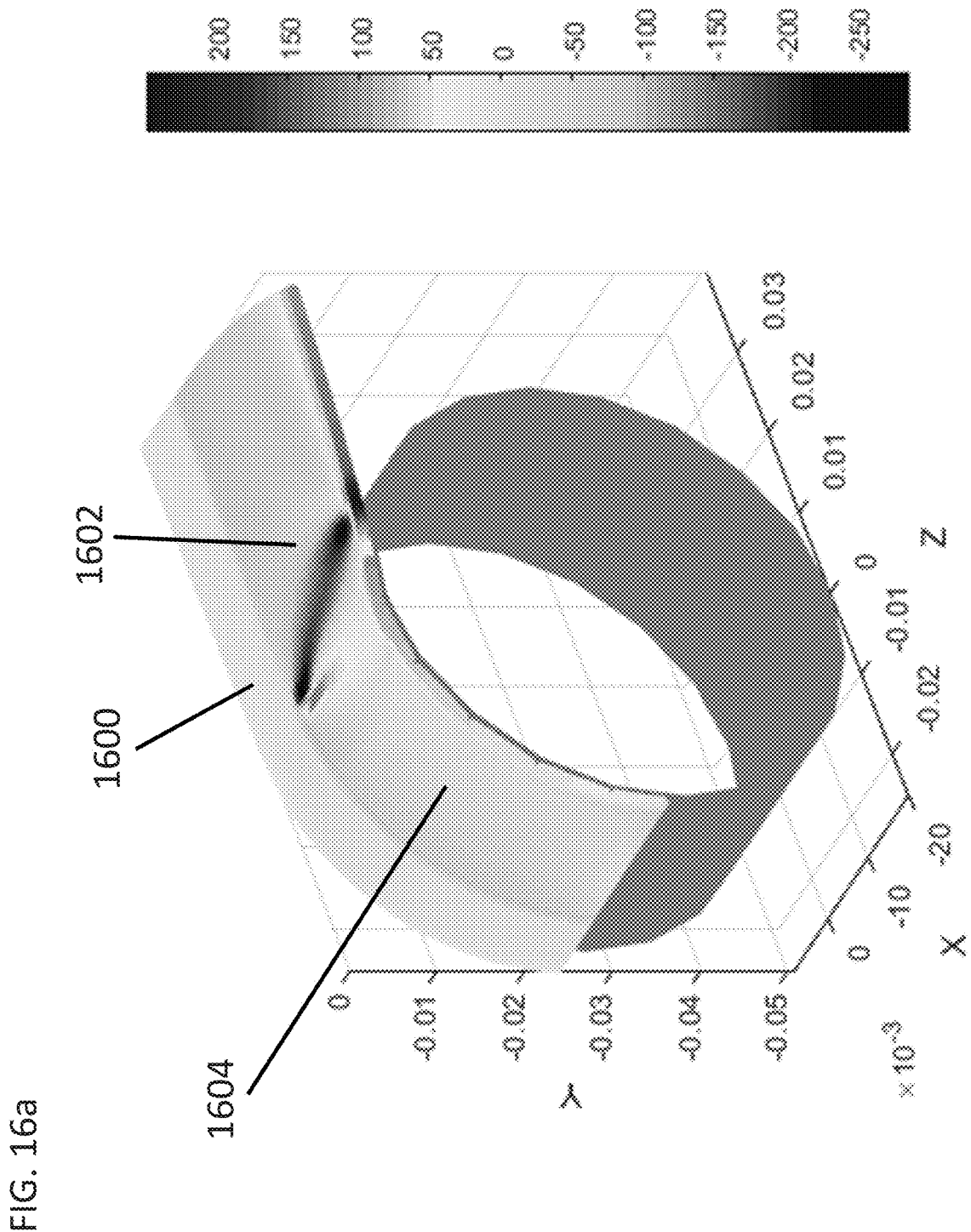
FIG. 16a provides a representative 3-D data graph of the stress imposed on a coilable longeron during the flattening and coiling process in accordance with the prior art.
Figure 16B:
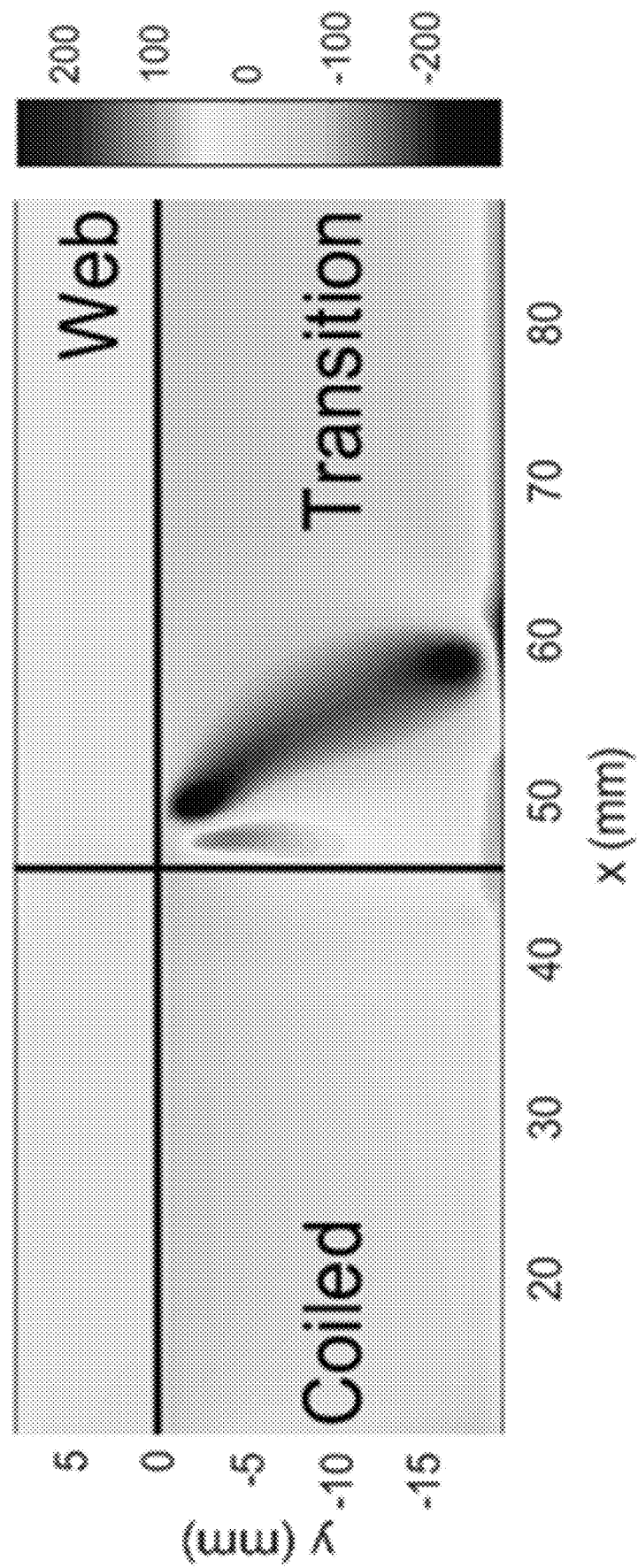
FIG. 16b provides a representative 2-D data graph of the stress imposed on a coilable longeron during the flattening and coiling process in accordance with the prior art.

Graphical results for the stress simulations below were analyzed in three dimensions and two dimensions, as shown in representative FIG. 16a and FIG. 16b, respectively. The web region 1600, transition region in which the flanges are flattened and coiled 1602, and coiled region 1604 are present in both sets of graphs and explicitly labeled in the two dimensional graphs. For simplicity, the labeled two dimensional graphs are used to present the stress simulation data.

Figure 17A:
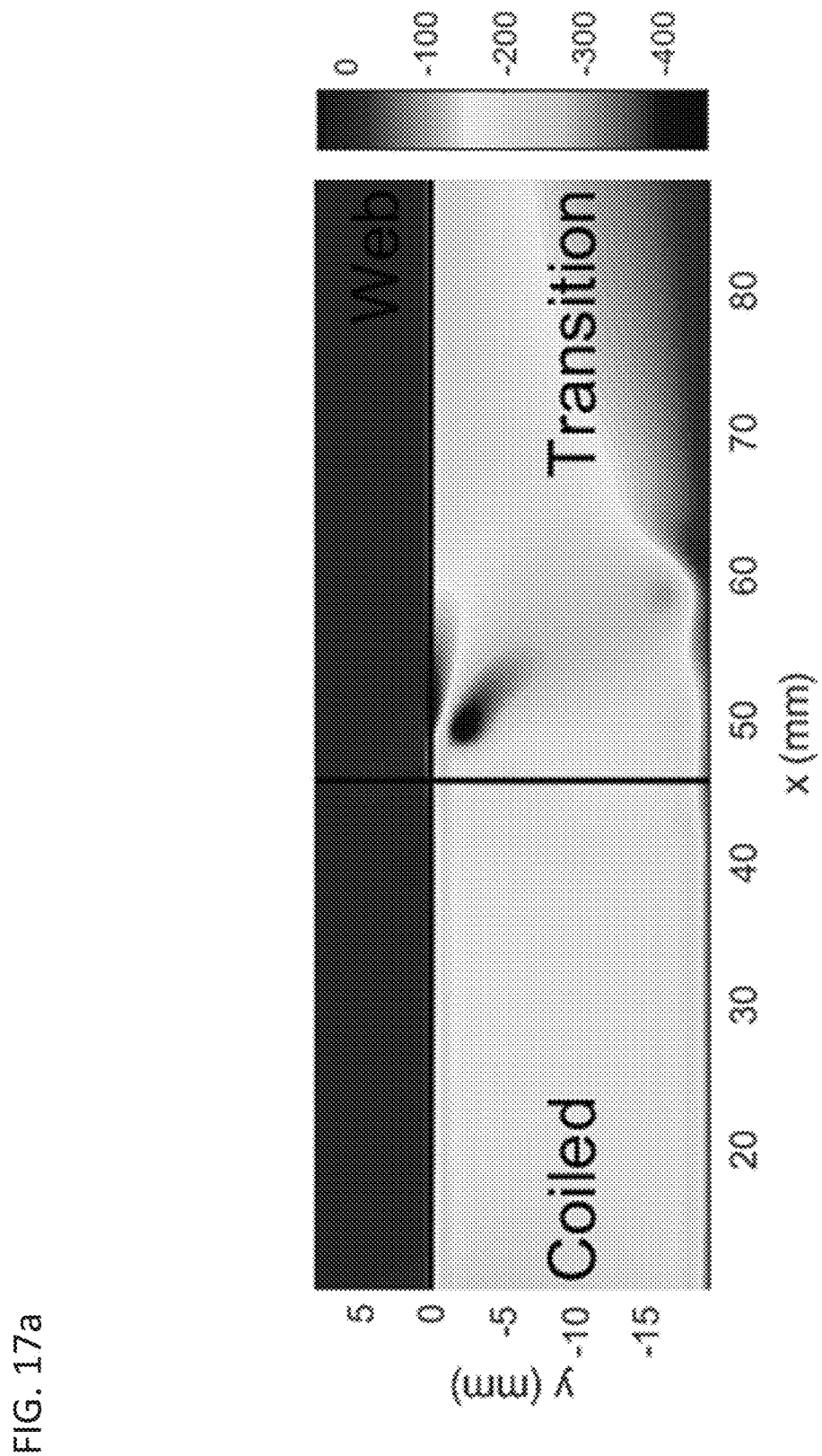
FIG. 17a provides a 2-D data graph of the stress imposed on a coilable longeron made of isotropic material in accordance with the prior art, during the flattening and coiling process in accordance with the prior art.
Figure 17B:
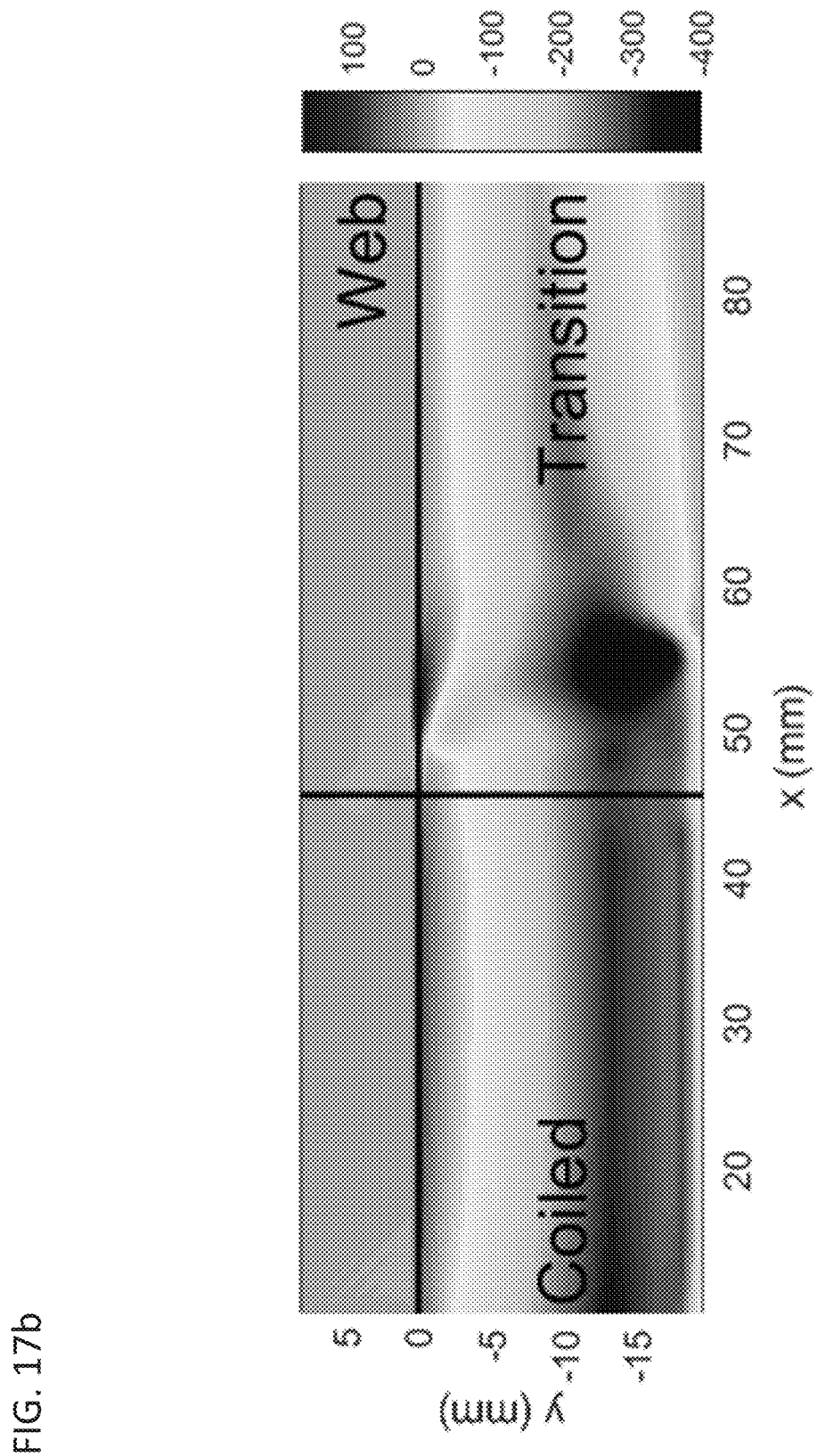
FIG. 17b provides a 2-D data graph of the stress imposed on a coilable thin-walled longeron with variable curvature made of isotropic material in accordance with an embodiment of the invention, during the flattening and coiling process in accordance with the prior art.
Figure 17C:
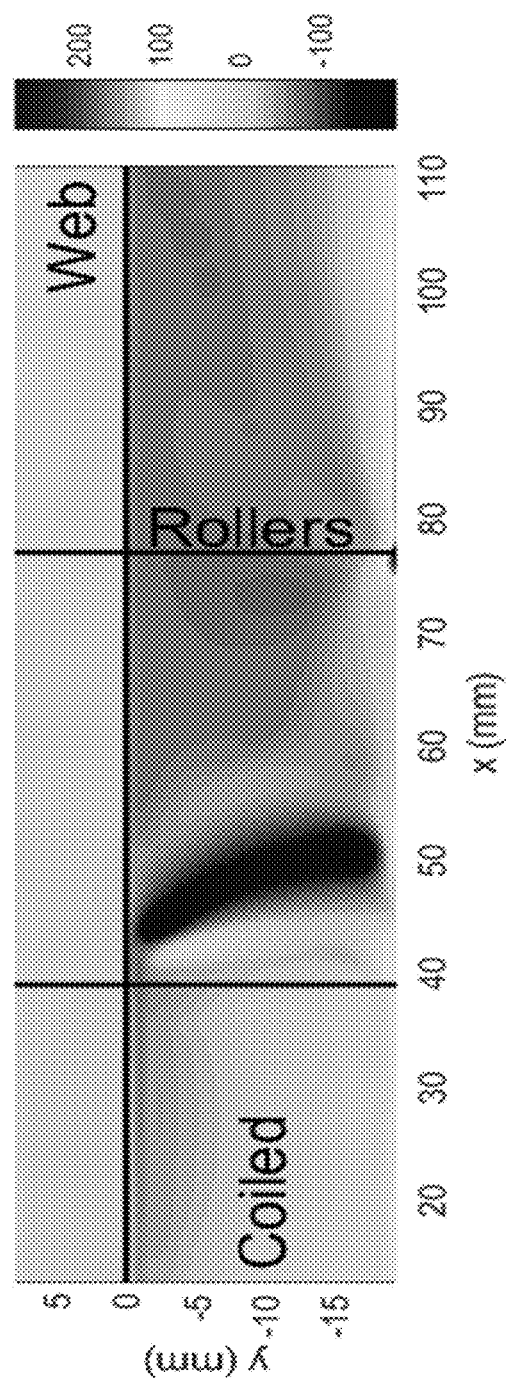
FIG. 17c provides a 2-D data graph of the stress imposed on a coilable thin-walled longeron made of isotropic material in accordance with the prior art, during a modified flattening and coiling process in accordance with an embodiment of the invention.

Three different configurations were analyzed for stress. The first was a longeron with two flanges of constant curvature and a one-step flattening and coiling process (denoted as "Reference"). The second was a longeron with two flanges of variable curvature and a one-step flattening and coiling process. The third was a longeron with two flanges of constant curvature and a two-step flattening and coiling process. FIG. 17a, FIG. 17b, and FIG. 17c represent the two dimensional stress graphs for the first configuration, second configuration, and third configuration, respectively.

In all three configurations, the highest stress concentration was a compressive stress that occurred on the proximal-most flange relative to the rigid cylindrical hub. The maximum stress, percent reduction of stress from the Reference, and corresponding figure for each configuration are presented in Table 1.

TABLE 1

Isotropic Coilable Longeron Configurations and Stress Properties

| Configuration | Maximum Compressive Stress (MPa) | Percent Reduction from Reference | Graphical FIG. |
|---|---|---|---|
| Reference: Isotropic Material, Constant Curvature, One-Step Transition | 460 | — | FIG. 17a |
| Isotropic Material, Variable Curvature, One-Step Transition | 400 | 13% | FIG. 17b |
| Isotropic Material, Constant Curvature, Two-Step Transition | 340 | 26% | FIG. 17c |

Example 3: Studies of Coilable Thin-Walled Longerons Made of Orthotropic Materials Coilable thin-walled longerons made of orthotropic materials were put through coiling simulations in various configurations to determine the maximum stresses on the longeron. The orthotropic material used was a 4-layer composite laminate. The innermost and outermost layers were 45° ply glass fiber plain weaves made with JPS E-glass fabric and Patz PMT-F4 epoxy resin, and the middle layers are unidirectional carbon fiber tape made of Torayca T800 carbon fibers with NTPT ThinPreg 402 epoxy resin.

Graphical results for the stress simulations below were analyzed identically to the previous exemplary embodiment. For simplicity, the labeled two dimensional graphs are used to present the stress simulation data.

Figure 18A:
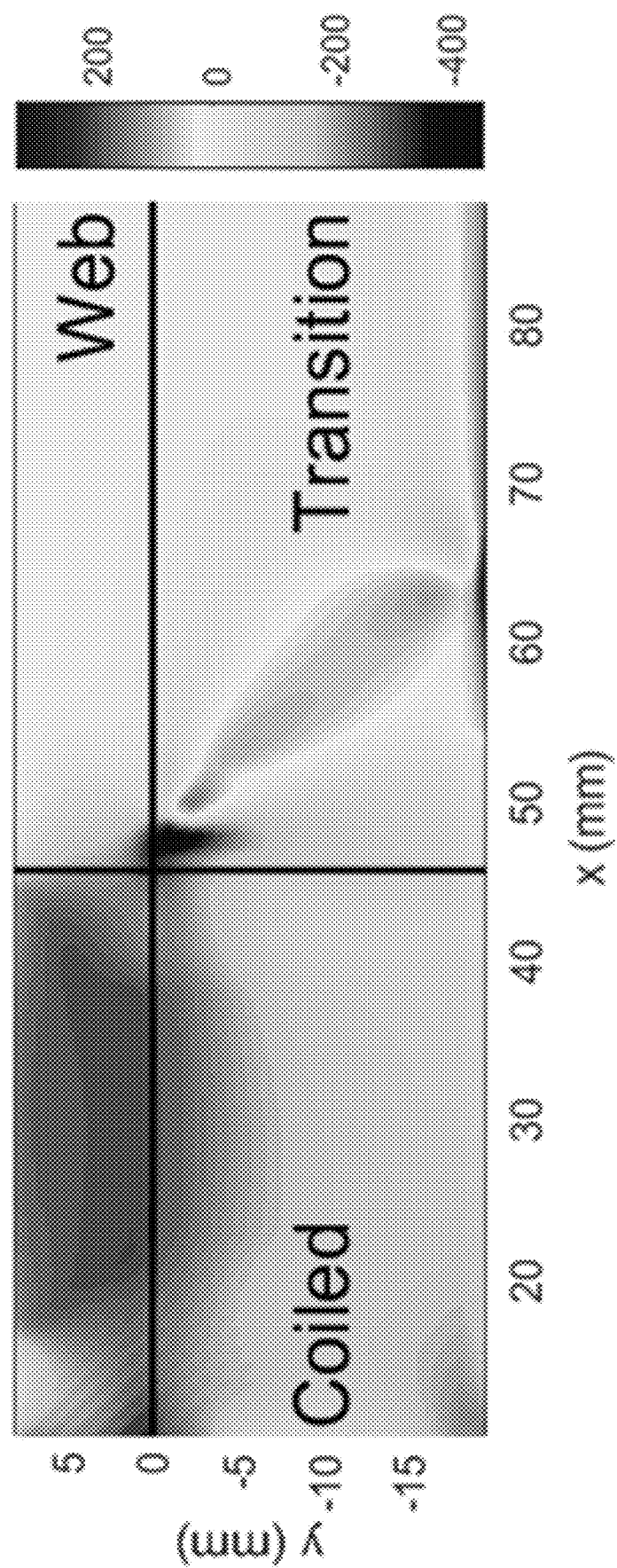
FIG. 18a provides a 2-D data graph of the stress imposed on a coilable longeron made of orthotropic material in accordance with the prior art, during the flattening and coiling process in accordance with the prior art.
Figure 18B:
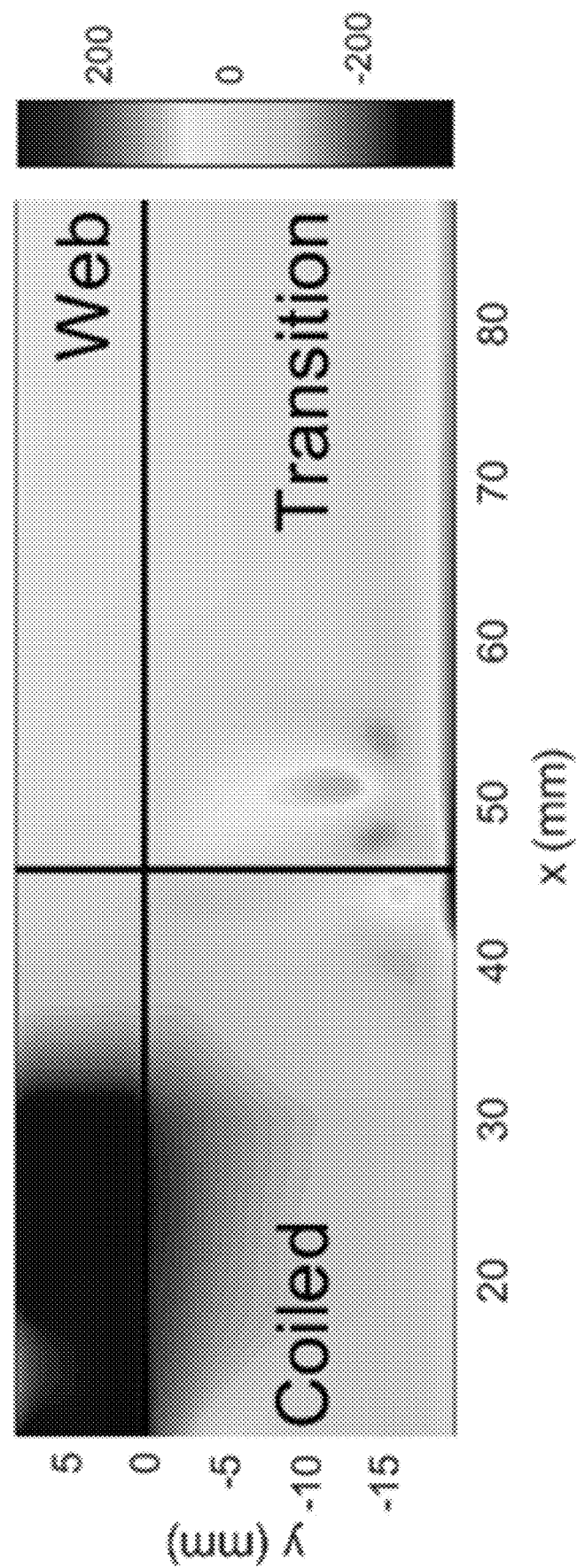
FIG. 18b provides a 2-D data graph of the stress imposed on a coilable thin-walled longeron with variable curvature made of orthotropic material in accordance with an embodiment of the invention, during the flattening and coiling process in accordance with the prior art.
Figure 18C:
FIG. 18c provides a 2-D data graph of the stress imposed on a coilable thin-walled longeron made of orthotropic material in accordance with the prior art, during a modified flattening and coiling process in accordance with an embodiment of the invention.

Similar to the previous exemplary embodiment, three different configurations were analyzed for stress. The first was a longeron with two flanges of constant curvature and a one-step flattening and coiling process (denoted as "Reference"). The second was a longeron with two flanges of variable curvature and a one-step flattening and coiling process. The third was a longeron with two flanges of constant curvature and a two-step flattening and coiling process. FIG. 18a, FIG. 18b, and FIG. 18c represent the two dimensional stress graphs for the first configuration, second configuration, and third configuration, respectively.

In all three configurations, the highest stress concentration was a compressive stress that occurred on the proximal-most flange relative to the rigid cylindrical hub. The maximum stress, percent reduction of stress from the Reference, and corresponding figure for each configuration are presented in Table 2.

TABLE 2

Orthotropic Coilable Longeron Configurations and Stress Properties

| Configuration | Maximum Compressive Stress (MPa) | Percent Reduction from Reference | Graphical FIG. |
|---|---|---|---|
| Reference: Orthotropic Material, Constant Curvature, One-Step Transition | 460 | — | FIG. 18a |
| Orthotropic Material, Variable Curvature, One-Step Transition | 350 | 24% | FIG. 18b |
| Orthotropic Material, Constant Curvature, Two-Step Transition | 410 | 11% | FIG. 18c |

Example 4: Constructing Spacecraft Structures from an Array of Coilable Thin-Walled Longerons Arrays of coilable thin-walled longerons can support the functional elements within space-based coilable structures. Such structures include space-based satellite strips. A space-based satellite strip in accordance with embodiments of the invention is illustrated in FIG. 5. These embodiments contain an array of coilable thin-walled longerons 500, which support functional elements 502.

Figure 19:
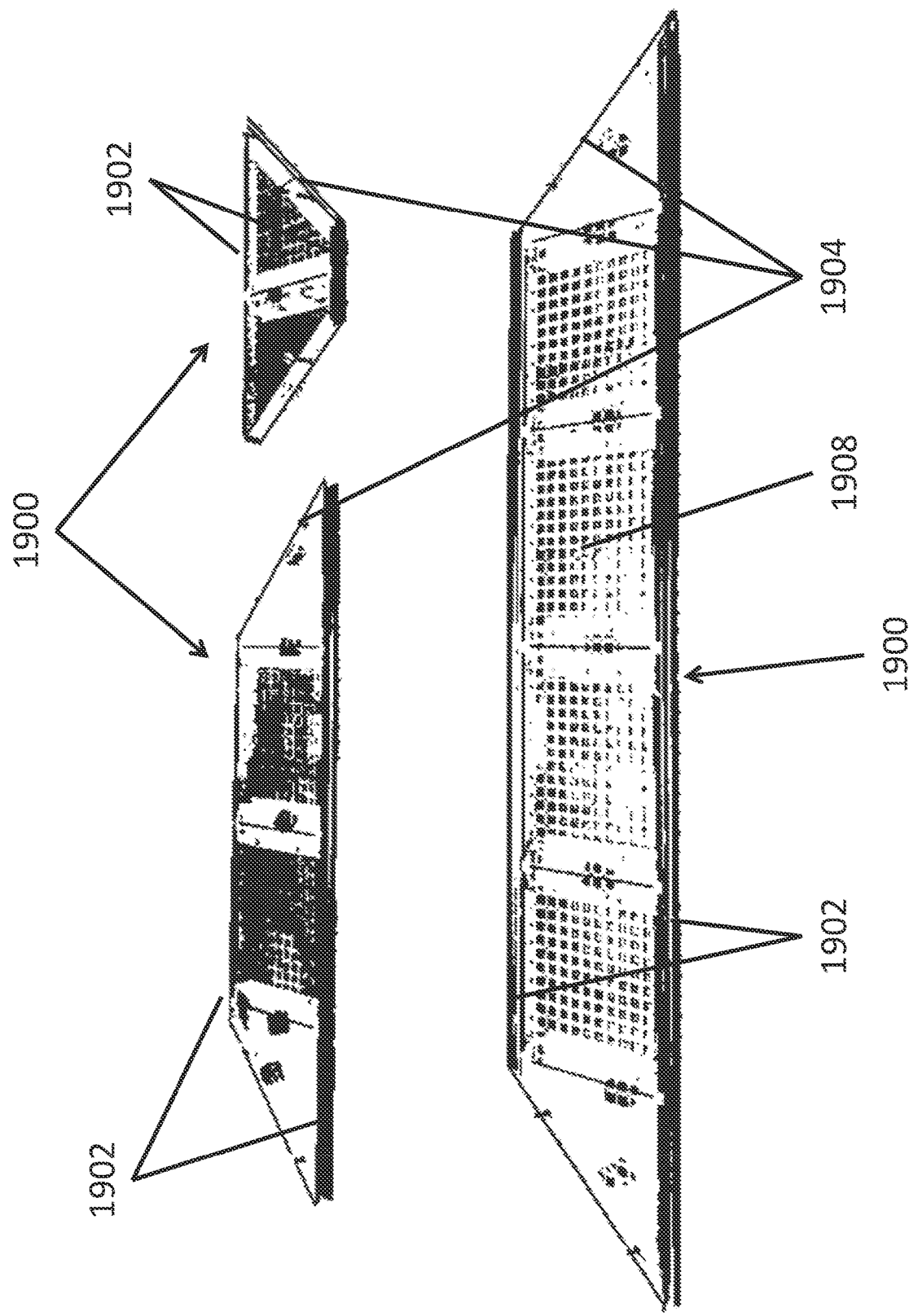
FIG. 19 provides an image of several space-based coilable strips, which incorporate coilable thin-walled longerons in accordance with an embodiment of the invention.

Several space-based satellite strips incorporating coilable thin-walled longerons in accordance with many embodiments of the invention is illustrated in FIG. 19. These strips 1900 contain many components of space-based coilable structures discussed above; namely, coilable thin-walled longerons 1902, diagonal battens 1904, transverse battens 1906, and functional elements 1908. These strips may combine with a series of additional strips to form a coilable space-based satellite module. This combination in accordance with some embodiments of the invention is illustrated in FIG. 20.

Figure 20:
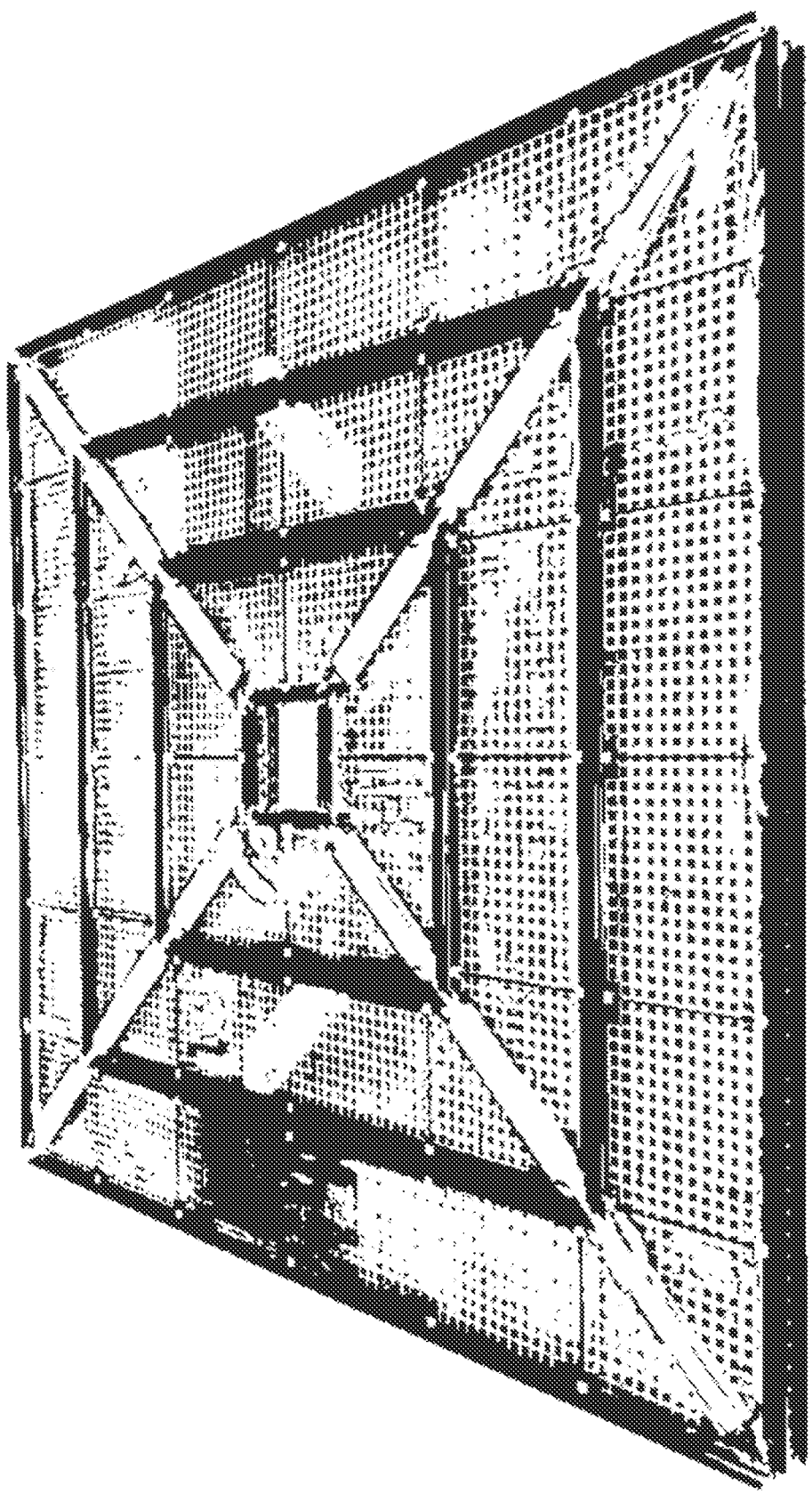
FIG. 20 provides an image of a space-based satellite module, which incorporates many space-based coilable strips in accordance with an embodiment of the invention.

The space-based satellite module illustrated in FIG. 20 may be capable of collapsing and coiling upon itself. One method for coiling such a structure in accordance with some embodiments of the invention is illustrated in FIG. 21a, FIG. 21b, FIG. 21c, and FIG. 21d. In this method, four sets of longerons are coiled onto a shared rigid hub.

DOCTRINE OF EQUIVALENTS

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:
1. A coilable flange longeron comprising:
  a plurality of elongated flange bodies each defining first and second edges extending in parallel longitudinally along the elongated flange bodies; and
  at least one web region formed from at least one conjoined portion of at least two of the plurality of elongated flange bodies;
  wherein each of the plurality of elongated flange bodies exhibits a curvature between the first and second edges;
  wherein each of the plurality of elongated flange bodies has a thickness of ≤200 μm;

wherein the at least one web region has a thickness of ≤400 μm;
wherein the coilable flange longeron has three configurations comprising:
   a deployed configuration, wherein the coilable structure has a thickness greater than the thickness of the web region;
   a flattened configuration, wherein the coilable structure has a thickness less than the thickness of the deployed configuration; and
   a coiled configuration, wherein the flattened configuration is additionally coiled around at least one object, and wherein the length of the at least one object is in a direction transverse to the longitudinal axis of the coilable structure; and
wherein the at least one web region permanently conjoins at least two of the plurality of elongated flange bodies using a temperature-cured resin.

2. The coilable flange longeron of claim 1, wherein the material of at least one of the plurality of elongated flange bodies is selected from the group consisting of carbon fiber, glass fiber, thermosetting plastics, and combinations thereof.

3. The coilable flange longeron of claim 1, wherein at least one of the plurality of elongated flange bodies comprises a multi-layer composite laminate, and wherein at least one material layer of the multi-layer composite laminate comprises a material selected from the group consisting of 45° ply glass fiber plain weaves, and unidirectional carbon fiber tape.

4. The coilable flange longeron of claim 1, wherein each of the plurality of elongated flange bodies comprises a four-layer composite laminate, and wherein the outermost layers comprise 45° ply glass fiber plain weaves, and the middle layers comprise a unidirectional carbon fiber tape.

5. The coilable flange longeron of claim 1, wherein each of the plurality of elongated flange bodies comprises a three-layer composite laminate, and wherein the outermost layers comprise 45° ply glass fiber plain weaves, and the middle layer comprises a unidirectional carbon fiber tape.

6. The coilable flange longeron of claim 1, comprising:
two elongated flange bodies; and
one web region formed by the conjoined first edges of each elongated flange body;
wherein the distance between the two elongated flange bodies increases between the web region and the second edges of each of the two elongated flange bodies.

7. The coilable flange longeron of claim 1, comprising:
two elongated flange bodies; and
one web region formed by the conjoined first edges of each elongated flange body;
wherein each elongated flange body between the web region and the second edge defines a spiral-shaped segment.

8. The coilable flange longeron of claim 1, comprising:
two elongated flange bodies; and
one web region formed by a conjoined portion of the two elongated flange bodies disposed between the first and second edges of both elongated flange bodies;
wherein the distance between the two elongated flange bodies increases between both the web region and the first edges of each of the two elongated flange bodies, and the web region and the second edges of each of the two elongated flange bodies.

9. The coilable flange longeron of claim 1, comprising:
two elongated flange bodies; and
two web regions, wherein a first web region is formed by a conjoined portion of the first edges of the two elongated flange bodies and a second web region is formed by a conjoined portion of the second edges of the two elongated flange bodies;
wherein the distance between the two elongated flange bodies increases between the two web regions.

10. The coilable flange longeron of claim 1, wherein the temperature-cured resin is selected from the group consisting of Patz PMT-F4 epoxy resin, Patz F6 epoxy resin, Patz F7 epoxy resin, NTPT TP-135, TP 402T, TP 180-380CE, and cyanate ester resins.

11. The coilable flange longeron of claim 1, wherein the coiled configuration is coiled around a cylinder with a radius of 0.5 inches to 3 inches.

12. A coilable space structure comprising:
at least two longerons each comprising a longeron body having at least one supporting surface;
at least one functional element disposed on the at least one supporting surface of the at least two longerons; and
wherein the coilable space structure has three configurations comprising:
   a deployed configuration, wherein the coilable structure has a thickness greater than the thickness of the longerons;
   a flattened configuration, wherein the coilable structure has a thickness less than the thickness of the deployed configuration; and
   a coiled configuration, wherein the flattened configuration is additionally coiled around at least one object, and wherein the length of the at least one object is in a direction transverse to the longitudinal axis of the coilable structure.

13. The coilable space structure of claim 12, wherein the at least two longerons have at least a top and a bottom supporting surface and having a longitudinal element disposed therebetween, and wherein the structure further comprises at least two functional elements one disposed atop the top supporting surface and a second disposed atop the bottom supporting surface.

14. The coilable space structure of claim 12, wherein the at least two elongated longerons are flange longerons, each flange longeron comprising:
a plurality of elongated flange bodies each defining first and second edges extending in parallel longitudinally along the elongated flange bodies; and
at least one web region formed from at least one conjoined portion of at least two of the plurality of elongated flange bodies;
wherein each of the plurality of elongated flange bodies exhibits a curvature between the first and second edges;
wherein each of the plurality of elongated flange bodies has a thickness of ≤200 μm;
wherein the at least one web region has a thickness of ≤400 μm; and
wherein the coilable structure has a deployed configuration, wherein the coilable structure has a thickness greater than the thickness of the web region; and
wherein the at least one functional element is disposed between the at least two flange longerons.

15. The coilable structure of claim 14, further comprising a plurality of functional elements each disposed between at least two flange longerons.

16. The coilable structure of claim 14, further comprising a plurality of battens interconnected between and disposed transverse to the at least two flange longerons.

17. The coilable structure of claim 14, wherein the curvature of the elongated flange bodies varies between the first and second edges thereof.

18. A compactible space module comprising:
at least one coilable space structure comprising:
- at least two longerons each comprising a longeron body having at least one supporting surface;
- at least one functional element disposed on the at least one supporting surface of the at least two longerons; and wherein the coilable space structure has three configurations comprising:
- a deployed configuration, wherein the coilable structure has a thickness greater than the thickness of the longerons;
- a flattened configuration, wherein the coilable structure has a thickness less than the thickness of the deployed configuration; and
- a coiled configuration, wherein the flattened configuration is additionally coiled around at least one object, and wherein the length of the at least one object is in a direction transverse to the longitudinal axis of the coilable structure; and at least one hub from which the longerons and functional elements extend in a deployed configurations and about which the longerons and functional elements coil in a coiled configuration; and wherein the longerons provide the structural support for the compactible space structure.

19. The compactible satellite module of claim 18, further comprising a plurality of functional elements each disposed between at least two longerons.

20. The compactible satellite module of claim 18, wherein the at least two elongated longerons are flange longerons, each flange longeron comprising:
- a plurality of elongated flange bodies each defining first and second edges extending in parallel longitudinally along the elongated flange bodies; and
- at least one web region formed from at least one conjoined portion of at least two of the plurality of elongated flange bodies;
- wherein each of the plurality of elongated flange bodies exhibits a curvature between the first and second edges;
- wherein each of the plurality of elongated flange bodies has a thickness of $\leq 200$ μm;
- wherein the at least one web region has a thickness of $\leq 400$ μm; and
  - wherein the coilable structure has a deployed configuration, wherein the coilable structure has a thickness greater than the thickness of the web region.

21. The compactible satellite module of claim 20, further comprising a plurality of battens interconnected between and disposed transverse to at least two longerons.

22. The compactible satellite module of claim 20, wherein the curvature of the elongated flange bodies varies between the first and second edges thereof.

* * * * *